(12) United States Patent
Zou

(10) Patent No.: US 12,148,075 B2
(45) Date of Patent: Nov. 19, 2024

(54) METHOD FOR ASSISTING MAKEUP, TERMINAL DEVICE, STORAGE MEDIUM, AND PROGRAM PRODUCT

(71) Applicant: Huawei Technologies Co., Ltd., Shenzhen (CN)

(72) Inventor: Tao Zou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 17/916,378

(22) PCT Filed: Mar. 25, 2021

(86) PCT No.: PCT/CN2021/082920
§ 371 (c)(1),
(2) Date: Sep. 30, 2022

(87) PCT Pub. No.: WO2021/197186
PCT Pub. Date: Oct. 7, 2021

(65) Prior Publication Data
US 2023/0154083 A1  May 18, 2023

(30) Foreign Application Priority Data
Apr. 1, 2020 (CN) .......................... 202010251470.0

(51) Int. Cl.
*G06T 11/60* (2006.01)
*A45D 44/00* (2006.01)

(52) U.S. Cl.
CPC ............ *G06T 11/60* (2013.01); *A45D 44/005* (2013.01)

(58) Field of Classification Search
CPC . G06T 11/60; G06T 7/246; G06T 7/73; G06T 2207/10024; G06T 2207/30201; G06T 3/04; A45D 44/005
See application file for complete search history.

(56) References Cited

U.S. PATENT DOCUMENTS

| 8,908,904 | B2 | 12/2014 | Santos et al. |
| 9,224,248 | B2 | 12/2015 | Ye et al. |
| 10,479,109 | B2 | 11/2019 | Wong et al. |

(Continued)

FOREIGN PATENT DOCUMENTS

| CN | 101350102 A | 1/2009 |
| CN | 101779218 A | 7/2010 |

(Continued)

OTHER PUBLICATIONS

Tang wen, et al., "Design of Intelligent Makeup Mirror Using Face Recognition Technology," 2018, 6 pages, with English Translation.

(Continued)

*Primary Examiner* — YuJang Tswei
(74) *Attorney, Agent, or Firm* — Conley Rose, P.C.

(57) ABSTRACT

A method includes displaying a face image of a user collected by a camera; obtaining makeup contours corresponding to a target makeup effect image, recognizing makeup areas corresponding to the makeup contours from the face image, and adaptively superimposing and displaying the makeup contours on the makeup areas corresponding to the makeup contours to enable the user to perform makeup based on the makeup contours.

20 Claims, 11 Drawing Sheets

(56) References Cited

U.S. PATENT DOCUMENTS

| | | |
|---|---|---|
| 11,069,094 B1* | 7/2021 | Evangelista ............ G06T 11/60 |
| 11,178,956 B1* | 11/2021 | Prout .................... A45D 44/005 |
| 2006/0078224 A1* | 4/2006 | Hirosawa ............... H04N 5/272 |
| | | 348/E5.037 |
| 2007/0035815 A1* | 2/2007 | Edgar .................... H04N 1/628 |
| | | 359/359 |
| 2012/0044335 A1 | 2/2012 | Goto |
| 2015/0118655 A1 | 4/2015 | Yamanashi et al. |
| 2015/0254501 A1 | 9/2015 | Yamanashi et al. |
| 2016/0328632 A1 | 11/2016 | Choe et al. |
| 2017/0358116 A1* | 12/2017 | Cheng .................... G06T 11/60 |
| 2018/0308384 A1 | 10/2018 | Shen et al. |
| 2018/0350046 A1* | 12/2018 | Sasaki ...................... G06T 5/94 |
| 2019/0014884 A1* | 1/2019 | Fu ........................ G06V 40/168 |
| 2019/0122029 A1* | 4/2019 | Shen .................... G06V 40/164 |
| 2019/0244408 A1* | 8/2019 | Nishi ........................ G06T 3/20 |
| 2019/0347832 A1 | 11/2019 | Nishi et al. |
| 2020/0211245 A1 | 7/2020 | Cn108765268a |
| 2021/0219700 A1* | 7/2021 | Mauger ................ G06T 11/001 |

FOREIGN PATENT DOCUMENTS

| | | |
|---|---|---|
| CN | 102184108 A | 9/2011 |
| CN | 102708575 A | 10/2012 |
| CN | 104205162 A | 12/2014 |
| CN | 105787981 A | 7/2016 |
| CN | 107153805 A | 9/2017 |
| CN | 107273837 A | 10/2017 |
| CN | 107361564 A | 11/2017 |
| CN | 107463936 A | 12/2017 |
| CN | 108765268 A | 11/2018 |
| CN | 109508620 A | 3/2019 |
| EP | 3457318 A1 | 3/2019 |
| JP | 2016081441 A | 5/2016 |

OTHER PUBLICATIONS

Scherbaum Kristina, "Data Driven Analysis of Faces from Images," Dissertation, Sep. 17, 2013, pp. 1-160, XP093004686.

* cited by examiner

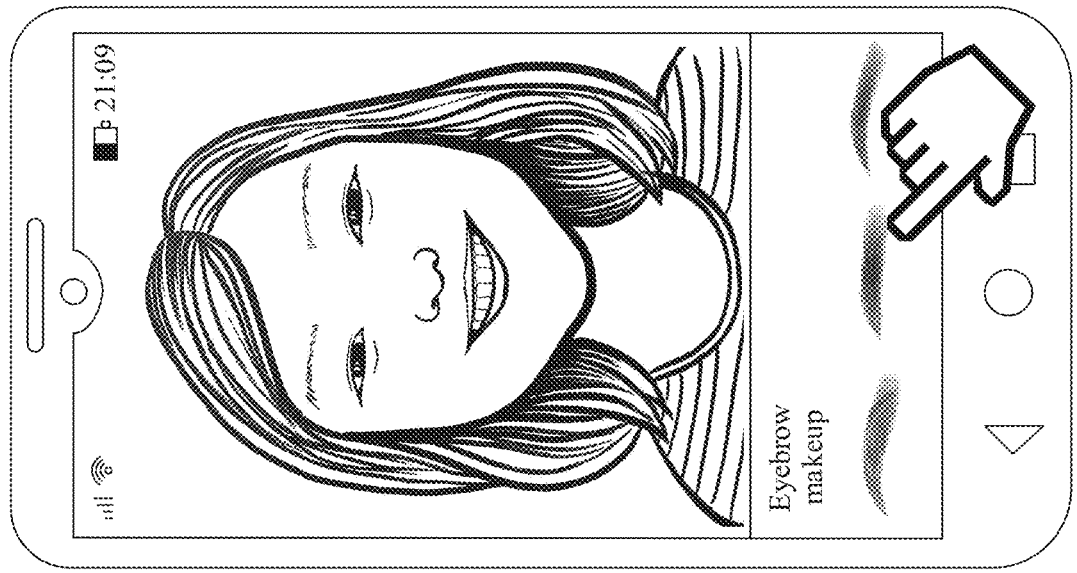
FIG. 3D
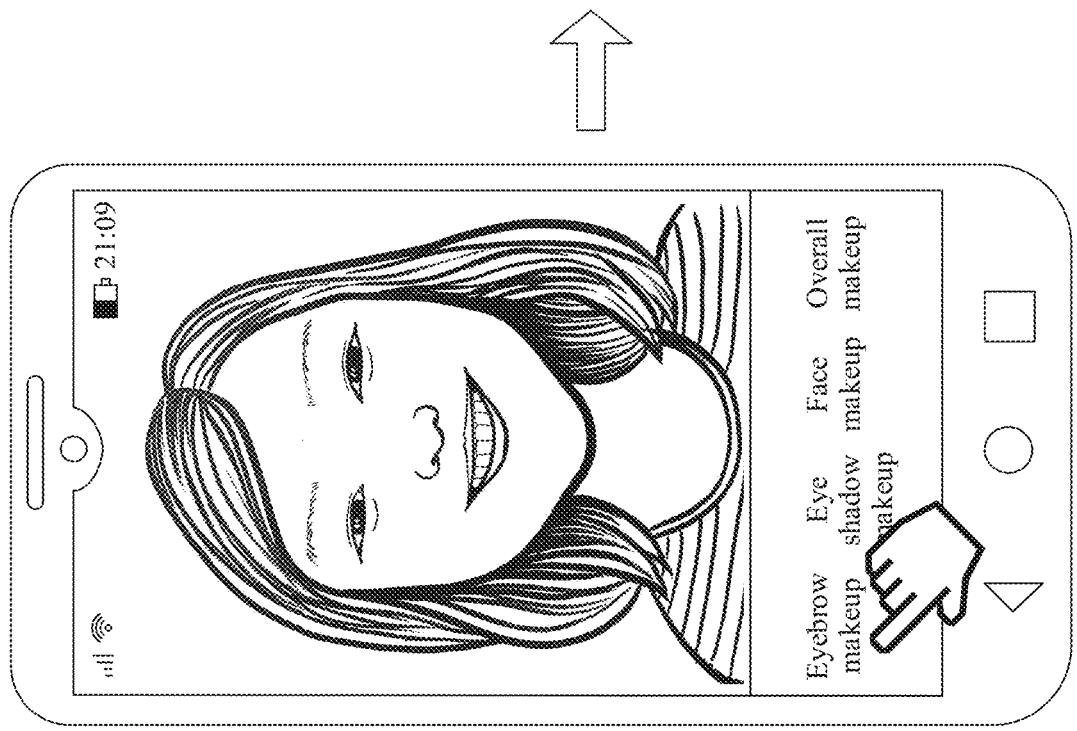
CONT.
FROM
FIG. 3B
FIG. 3C

Squarish face　　　　Oval face　　　　Round face

Slanted eye　　Almond eye　　Willow eye　　Peach-blossom-shaped eye

METHOD FOR ASSISTING MAKEUP, TERMINAL DEVICE, STORAGE MEDIUM, AND PROGRAM PRODUCT

CROSS-REFERENCE TO RELATED APPLICATIONS

This is a U.S. National Stage of International Patent Application No. PCT/CN2021/082920 filed on Mar. 25, 2021, which claims priority to Chinese Patent Application No. 202010251470.0 filed on Apr. 1, 2020. Both of the aforementioned applications are hereby incorporated by reference in their entireties.

TECHNICAL FIELD

This application belongs to the field of communications technologies, and in particular, to a method for assisting makeup, a terminal device, a storage medium, and a program product.

BACKGROUND

Makeup means that cosmetics and tools are used to render, draw, and finish a face, five sense organs, and another part of a human body by taking appropriate steps and skills, to enhance a three-dimensional impression, adjust a shape and a color, mask a defect, and express delights, to achieve the purpose of beautifying visual perception. In different environments, seasons and different occasions, makeup may also be different.

A user usually performs makeup in a manner of facing a mirror, for example, draws eyebrows, performs painting with an eye shadow, a lipstick, or a blusher, and performs modification and improvement based on a makeup effect. Because the makeup includes many steps and processing skills, it is difficult for a makeup novice to make up a same or similar makeup in an actual operation process even if makeup is performed in a manner of facing a video tutorial or a post-makeup image (that is, an image in which the makeup is completed). Currently, there is no effective solution to assist the user in makeup.

SUMMARY

This application provides a method for assisting makeup, a terminal device, a storage medium, and a program product, to resolve a problem that currently there is no effective solution to assist a user in makeup, and makeup reference cannot be provided for the user.

According to a first aspect, this application provides a method for assisting makeup. The method includes:
displaying a face image of a user collected by a camera;
obtaining makeup contours corresponding to a target makeup effect image; and
recognizing makeup areas corresponding to the makeup contours from the face image, and adaptively superimposing and displaying the makeup contours on the makeup areas corresponding to the makeup contours, to assist the user in makeup.

It should be noted that the user refers to a user who needs makeup. The face image may be a natural image before makeup, or may be an image collected in a makeup process. The target makeup effect image is a post-makeup image. The target makeup effect image may be a makeup effect image for an entire face. The target makeup effect image may be from a makeup magazine, or may be a makeup effect image obtained by the user by street snap. A terminal device may extract the corresponding makeup contours from the target makeup effect image by using an image recognition technology or a related image processing algorithm, or may obtain the makeup contours corresponding to the target makeup effect image from the server.

It may be understood that, in a contour superimposing process, the terminal device can enlarge or reduce the makeup contour based on an actual requirement, to match a facial feature (for example, an eyebrow shape, an eye shape, a mouth shape, or a face shape) of the user. The terminal device may further provide a corresponding entry for the user to edit the makeup contour or adjust a size and a location of the makeup contour.

In this solution, the terminal device may dynamically obtain the face image of the user in real time, and obtain the makeup contours corresponding to the target makeup effect image selected by the user, or recommend the target makeup effect image to the user based on the face image of the user by using an artificial intelligence technology and a face recognition technology, and obtain the makeup contours corresponding to the target makeup effect image. The makeup contours corresponding to the target makeup effect image are superimposed and displayed on the corresponding makeup areas in the face image of the user, so that the user performs makeup based on the makeup contours. This manner for assisting makeup based on the makeup contours can provide effective makeup reference for the user in a makeup process of the user, and improve a makeup skill of the user, so that the user can make up makeup that is similar to or the same as makeup in the target makeup effect image.

In a possible implementation of the first aspect, the target makeup effect image is a makeup effect image selected by the user.

It should be noted that a mobile phone can obtain a makeup contour corresponding to a makeup effect image that is manually selected by the user from a user interface, or can obtain the makeup contour corresponding to the target makeup effect image based on a voice message entered by the user.

In this solution, the user may manually select a needed target makeup effect image from the user interface based on an actual requirement. When detecting the target makeup effect image selected by the user, the terminal device obtains the makeup contours corresponding to the target makeup effect image.

In a possible implementation of the first aspect, the makeup effect image displayed on the user interface is obtained from a server after the terminal device detects that the user selects a target makeup type.

In a possible implementation of the first aspect, the target makeup effect image is a makeup effect image that is recommended by the terminal device based on the face image by using an artificial intelligence technology.

The terminal device may intelligently recommend one or at least two makeup effect images to the user. This is not limited herein.

In this solution, the terminal device can intelligently recommend the makeup effect image to the user by using the artificial intelligence technology.

In a possible implementation of the first aspect, after the adaptively superimposing and displaying the makeup contours on the makeup areas corresponding to the makeup contours, the method further includes:
detecting a movement of the face image; and
controlling the makeup contours to adaptively move along with the face image.

In this solution, because a location of a face of the user may change in the makeup process, when the face of the user moves, a face image displayed by a terminal moves as the face of the user moves, so that the makeup contours are always displayed on the corresponding makeup areas in a superimposed manner. This can avoid that the user cannot accurately perform makeup on the corresponding makeup areas based on the makeup contours because the makeup contours and the corresponding makeup areas are in different locations due to head turning of the user.

In a possible implementation of the first aspect, after the adaptively superimposing and displaying the makeup contours on the makeup areas corresponding to the makeup contours, the method further includes:

evaluating makeup corresponding to each of the makeup contour based on the face image, and obtaining a makeup evaluation result.

In this solution, to enable the user to more accurately make up the makeup that is the same as or similar to the makeup in the makeup effect image, in a process in which the user performs makeup based on any makeup contour, or when makeup is completed, the terminal device can evaluate makeup effect of the face image of the user, to determine whether a current makeup is consistent with the makeup in the target makeup effect image, so as to evaluate accuracy of makeup of the user. This resolves a problem that a current makeup application does not evaluate the makeup effect of the face image of the user, and cannot further provide a correction prompt.

In a possible implementation of the first aspect, after the obtaining a makeup evaluation result, the method further includes:

outputting correction reminder information based on the makeup evaluation result when makeup corresponding to any makeup area in the face image is inconsistent with makeup in the target makeup effect image.

In this solution, when the makeup corresponding to any makeup area in the face image is inconsistent with the makeup in the target makeup effect image, the correction reminder information can be output, to prompt the user to correct the makeup.

In a possible implementation of the first aspect, after the displaying a face image of a user collected by a camera, the method further includes:

obtaining makeup guide information corresponding to the target makeup effect image; and correspondingly, after the adaptively superimposing and displaying the makeup contours on the makeup areas corresponding to the makeup contours, the method further includes:

displaying or broadcasting, through voice, the makeup guide information.

For example, the makeup guide information may be used to describe color information corresponding to the makeup contours in the target makeup effect image.

In this solution, the makeup guide information corresponding to the target makeup effect image may help the user make up the makeup that is the same as or more similar to the makeup in the makeup effect image.

In a possible implementation of the first aspect, the evaluating makeup corresponding to each makeup contour includes: detecting whether makeup in each makeup area in the face image exceeds the makeup contour. When the makeup in any one of the makeup areas exceeds the makeup contour, it is indicated that the makeup corresponding to the makeup area is inconsistent with makeup in the target makeup effect image.

In this solution, the terminal device may determine, by detecting whether the makeup in each makeup area in the face image exceeds the makeup contour, whether the makeup made up by the user is consistent with the makeup in the makeup effect image, to evaluate the accuracy of makeup of the user.

In a possible implementation of the first aspect, the evaluating makeup corresponding to each makeup contour further includes: detecting whether an actual color inside each of the makeup contours in the face image is consistent with a preset color inside each makeup contour in the target makeup effect image. When the makeup in any one of the makeup areas exceeds the makeup contour, or an actual color inside any one of the makeup contours is inconsistent with a preset color, it is indicated that the makeup corresponding to the makeup area is inconsistent with the makeup in the target makeup effect image.

In this solution, the terminal device may detect whether the actual colors inside the makeup contours are consistent with the preset colors corresponding to all the makeup contours in the makeup effect image, to determine whether the makeup made up by the user is consistent with the makeup in the makeup effect image, to evaluate the accuracy of makeup of the user.

In a possible implementation of the first aspect, the detecting whether makeup in each makeup area in the face image exceeds the makeup contour includes:

obtaining information about an actual color outside a makeup contour in each makeup area in the face image, and obtaining information about a preset color outside each makeup contour in the target makeup effect image.

When a corresponding actual color outside the makeup contour in any one of the makeup areas is different from a preset color, the makeup in the makeup area exceeds the makeup contour.

In this solution, the terminal device may determine, by comparing corresponding actual color information and preset color information outside a makeup contour in a same makeup area, whether the actual colors outside the makeup contours are consistent with corresponding preset colors outside all the makeup contours in the makeup effect image. This can improve accuracy of a determined result.

In a possible implementation of the first aspect, to more accurately detect whether the actual colors outside the makeup contours are consistent with the corresponding preset colors outside all the makeup contours in the makeup effect image, the obtaining information about an actual color outside a makeup contour in each makeup area in the face image includes:

determining an actual contour area and a contour determining area that correspond to each of the makeup contours in the face image, where the actual contour area includes a makeup contour, and the contour determining area is obtained by enlarging the actual contour area based on a preset proportion; and obtaining a color of an area other than the actual contour area in the contour determining area corresponding to each of the makeup contours, to obtain the actual color outside the makeup contour.

In a possible implementation of the first aspect, the outputting correction reminder information based on the makeup evaluation result includes: marking a target area in the face image with an eye-catching color. The target area is a makeup area that is inconsistent with the makeup in the target makeup effect image.

In this solution, when detecting that the makeup made up by the user exceeds a makeup contour, the terminal device may mark the makeup contour, and when detecting that an actual color of any area in a makeup contour is inconsistent with a corresponding preset color, mark a makeup color of the area, to remind the user of correction. This implements real-time guidance, real-time evaluation and reminding in the makeup process, so that the user performs correction in a timely manner, and make up the makeup the same as the makeup in the makeup effect image as much as possible.

In a possible implementation of the first aspect, the makeup contour includes at least one of an eyebrow makeup contour, an eye shadow contour, a blush contour, and a lip makeup contour.

In a possible implementation of the first aspect, the eye shadow contour and/or the blush contour include/includes a plurality of areas.

For example, a makeup area corresponding to the eyebrow makeup contour is an eyebrow area in the face image of the user. A makeup area corresponding to the eye shadow contour may be an eye shadow area, and the eye shadow area may be a location of an eyelid in the face image of the user. A makeup area corresponding to the lip makeup contour is an area in which a lip is located in the face image of the user. A makeup area corresponding to the blush contour may be a cheek area in the face image of the user, or may be an area in which cheekbone is located. The makeup area corresponding to the blush contour may be a circle or an ellipse centered on a highest part of the cheekbone (a raised part of the cheekbone is used as a center when smiling).

According to a second aspect, this application provides a makeup assisting apparatus. The makeup assisting apparatus may be used in a terminal device. The makeup assisting apparatus includes:
  a display unit, configured to display a face image of a user collected by a camera;
  an obtaining unit, configured to obtain makeup contours corresponding to a target makeup effect image; and
  a makeup assisting unit, configured to recognize makeup areas corresponding to the makeup contours from the face image, and adaptively superimpose and display the makeup contours on the makeup areas corresponding to the makeup contours, to assist the user in makeup.

In a possible implementation of the second aspect, the target makeup effect image is a makeup effect image selected by the user.

In a possible implementation of the second aspect, the target makeup effect image is a makeup effect image that is recommended by the makeup assisting apparatus based on the face image by using an artificial intelligence technology.

In a possible implementation of the second aspect, the makeup assisting apparatus may further include:
  a detection unit, configured to detect a movement of the face image after the makeup assisting unit adaptively superimposes and displays the makeup contours on the makeup areas corresponding to the makeup contours; and
  a makeup contour adjustment unit, configured to control the makeup contours to adaptively move along with the face image.

In a possible implementation of the second aspect, the makeup assisting apparatus may further include:
  a makeup evaluation unit, configured to: after the makeup assisting unit adaptively superimposes and displays the makeup contours on the makeup areas corresponding to the makeup contours, evaluate makeup corresponding to each of the makeup contour based on the face image, to obtain a makeup evaluation result.

In a possible implementation of the second aspect, the makeup assisting apparatus may further include:
  a reminding unit, configured to output correction reminder information based on the makeup evaluation result when the makeup evaluation result indicates that makeup corresponding to any makeup area in the face image is inconsistent with makeup in the target makeup effect image.

In a possible implementation of the second aspect, the reminding unit is specifically configured to mark a target area in the face image with an eye-catching color. The target area is a makeup area that is inconsistent with the makeup in the target makeup effect image.

In a possible implementation of the second aspect, the obtaining unit may be further configured to obtain makeup guide information corresponding to the target makeup effect image.

Correspondingly, after the makeup assisting unit adaptively superimposes and displays the makeup contours on the makeup areas corresponding to the makeup contours, the makeup assisting unit may be further configured to display or broadcast, through voice, the makeup guide information.

In a possible implementation of the second aspect, the makeup evaluation unit may include:
  a first evaluation unit, configured to detect whether makeup in each makeup area in the face image exceeds the makeup contour. When the makeup in any one of the makeup areas exceeds the makeup contour, it is indicated that the makeup corresponding to the makeup area is inconsistent with makeup in the target makeup effect image.

In a possible implementation of the second aspect, the makeup evaluation unit may further include:
  a second evaluation unit, configured to detect whether an actual color inside each of the makeup contours in the face image is consistent with a preset color inside each makeup contour in the target makeup effect image. When the makeup in any one of the makeup areas exceeds the makeup contour, or an actual color inside any one of the makeup contours is inconsistent with a preset color, it is indicated that the makeup corresponding to the makeup area is inconsistent with the makeup in the target makeup effect image.

In a possible implementation of the second aspect, the first evaluation unit is specifically configured to:
  obtain information about an actual color outside a makeup contour in each makeup area in the face image, and obtain information about a preset color outside each makeup contour in the target makeup effect image.

When a corresponding actual color outside the makeup contour in any one of the makeup areas is different from a preset color, the makeup in the makeup area exceeds the makeup contour.

In a possible implementation of the second aspect, the first evaluation unit is further configured to:
  determine an actual contour area and a contour determining area that correspond to each of the makeup contours in the face image, where the actual contour area includes a makeup contour, and the contour determining area is obtained by enlarging the actual contour area based on a preset proportion; and
  obtain a color of an area other than the actual contour area in the contour determining area corresponding to each of the makeup contours, to obtain the actual color outside the makeup contour.

In a possible implementation of the second aspect, the makeup contour includes at least one of an eyebrow makeup contour, an eye shadow contour, a blush contour, and a lip makeup contour.

In a possible implementation of the second aspect, the eye shadow contour and/or the blush contour include/includes a plurality of areas.

In a possible implementation of the second aspect, the makeup effect image displayed on the user interface is obtained from a server after the terminal device detects that the user selects a target makeup type.

According to a third aspect, this application provides a terminal device. The terminal device includes a memory, a processor, and a computer program that is stored in the memory and that can be run on the processor. When the processor executes the computer program, the terminal device performs the method for assisting makeup according to any one of the possible implementations of the foregoing first aspect. According to a fourth aspect, this application provides a computer-readable storage medium. The computer-readable storage medium stores a computer program. When the computer program is executed by a processor, a terminal device is enabled to perform the method for assisting makeup according to any one of the possible implementations of the foregoing first aspect.

According to a fifth aspect, this application provides a computer program product. When the computer program product runs on a terminal device, the terminal device performs the method for assisting makeup according to any one of the possible implementations of the foregoing first aspect.

It may be understood that, for beneficial effects of the foregoing second aspect to the fifth aspect, refer to related descriptions in the foregoing first aspect. Details are not described herein again.

Compared with the conventional technology, embodiments of this application have the following beneficial effects: The face image of the user is obtained in real time, the makeup contours corresponding to the target makeup effect image are obtained, and the makeup contours corresponding to the target makeup effect image are superimposed and displayed on the corresponding makeup areas in the face image of the user, so that the user performs makeup based on the makeup contours. This manner for assisting makeup based on the makeup contours can provide the effective makeup reference for the user in the makeup process of the user, and improve the makeup skill of the user, so that the user can make up the makeup that is similar to or the same as the makeup in the target makeup effect image.

BRIEF DESCRIPTION OF DRAWINGS

FIG. 3A to FIG. 3D are diagrams of user interfaces according to an embodiment of this application;

FIG. 3I is an image obtained after an area in which an eyebrow contour is displayed in a superimposed manner in FIG. 3H is zoomed in:

DESCRIPTION OF EMBODIMENTS

Figure 1:
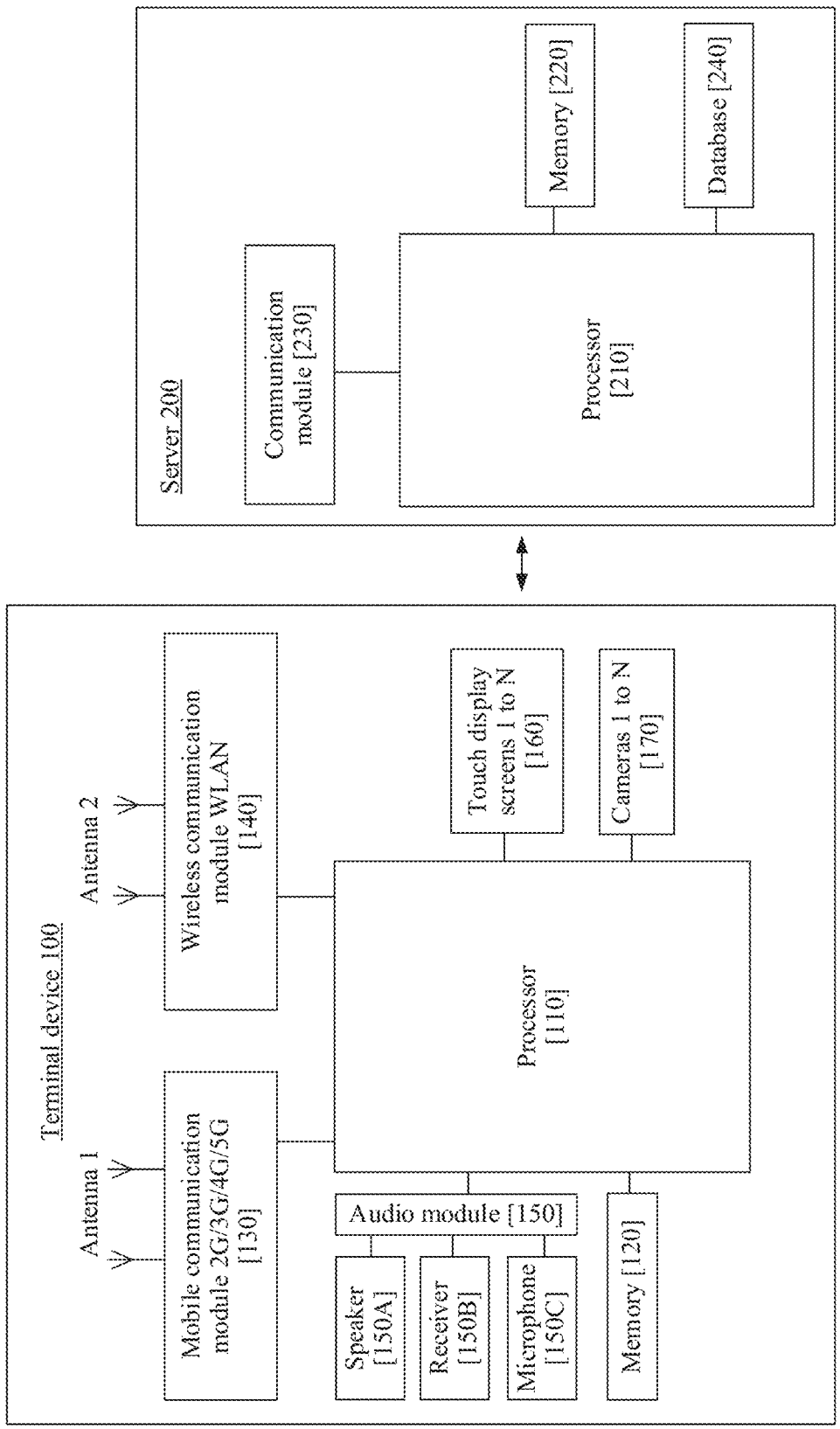
FIG. 1 is a schematic diagram of a makeup assisting system according to an embodiment of this application.

In the following description, to illustrate rather than limit, specific details such as a particular system structure, and a technology are provided to make a thorough understanding of embodiments of this application. However, a person skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Similarly, according to the context, the phrase "if it is determined that" or "if (a described condition or event) is detected" may be interpreted as a meaning of "once it is determined that" or "in response to determining" or "once (a described condition or event) is detected" or "in response to detecting (a described condition or event)".

In addition, in the specification and the appended claims of this application, the terms "first", "second", "third", and the like are merely used for distinguishing description, and shall not be understood as an indication or implication of relative importance.

Reference to "one embodiment" or "some embodiments" described in this specification of this application means that one or more embodiments of this application include a particular feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In daily life, a user may use a makeup application (Application, App) installed in a terminal device, for example a mobile phone to assist in makeup, which mainly includes the following manners.

1. Descriptive makeup assisting: A user taps a preset link or option in an app of a mobile phone to invoke a page, makeup steps and skills are described on the page by using text or a combination of text and graphics, and the user performs makeup with reference to the makeup steps and skills displayed on the page. Because the mobile phone needs a separate page to display the makeup steps and skills, the mobile phone cannot simultaneously display, on a display screen, an image of a user collected by a camera and content on the page. Therefore, in a makeup process, when viewing the image of the user, the user cannot refer to the makeup steps and skills displayed on the page.

2. Facing-type makeup assisting: When the user needs makeup, the user selects a required post-makeup image by using the app of the mobile phone, and the user performs makeup in a manner of facing the displayed post-makeup image. For example, a face image of the user collected by the camera is displayed on a user interface (User Interface, UI) of the app of the mobile phone. If detecting that the user selects an eyebrow makeup image (for example, a minus-shaped eyebrow), the mobile phone displays the eyebrow makeup image near an eyebrow in the face image of the user, so that the user draws an eyebrow in a manner of facing the displayed eyebrow makeup image. The foregoing method for assisting makeup mainly has the following problems.

1. For the descriptive makeup assisting, existing makeup steps and skills are integrated into the app of the mobile phone for ease of reference by the user. This manner is not instructive enough in the makeup process of the user, and the user can only determine, based on feeling, a location from which makeup should be started, a specific location to which makeup should be applied, and the like. Therefore, a makeup skill of the user cannot be effectively improved, a makeup result for the user is not improved, and makeup that is poorly made up is still poor. In addition, because the mobile phone cannot simultaneously display the image of the user and the makeup steps and skills on the page, in the makeup process, when viewing the image of the user, the user needs to exit the page, and it is inconvenient to switch pages back and forth.

2. For the facing-type makeup assisting, the user performs makeup in a manner of facing the post-makeup image. This is static imitative makeup. The user can only determine, based on feeling, a location from which makeup should be started, a specific location to which makeup should be applied, and the like. Therefore, detailed guidance cannot be provided for the makeup process. It is very difficult for the user to make up makeup in the post-makeup image, and makeup that is poorly made up is still poor.

In conclusion, the foregoing method for assisting makeup cannot provide a makeup reference for the user. When using the foregoing method to perform makeup, the user can only determine, based on the feeling, the location from which the makeup should be started, the specific location to which the makeup should be applied, and the like. For makeup that is poorly made up, the user still cannot well make up the makeup and cannot make up satisfactory makeup.

To resolve the foregoing problem, embodiments of this application provide a method for assisting makeup. A makeup contour corresponding to a makeup effect image is superimposed and displayed on a corresponding make-up area in a face image of a user, so that the user performs makeup in a manner of facing the makeup contour. This manner for assisting makeup based on the makeup contour can provide effective makeup reference for the user in a makeup process of the user, and improve a makeup skill of the user, so that the user can make up makeup that is similar to or the same as makeup in a makeup effect image selected by the user. To make the objectives, technical solutions, and advantages of this application clearer, the following further describes in detail a specific implementation of the method for assisting makeup in this application with reference to the accompanying drawings.

FIG. 1 is a schematic diagram of a makeup assisting system according to an embodiment of this application. In the schematic diagram of the system shown in FIG. 1, the makeup assisting system includes a terminal device 100 and a server 200. The terminal device 100 and the server 200 may communicate with each other. The terminal device 100 includes but is not limited to a mobile phone. An app that can implement makeup assisting, for example, a mirror app, is installed in the terminal device 100. The server 200 stores makeup template information, and is configured to provide related services for the app that can implement the makeup assisting, such as downloading the makeup template information, for example, downloading a makeup effect image in the makeup template information.

As shown in FIG. 1, the terminal device 100 may include a processor 110, a memory 120, an antenna 1, an antenna 2, a mobile communication module 130, a wireless communication module 140, an audio module 150, a speaker 150A, a receiver 150B, a microphone 150C, a touch display screen 160, a camera 170, and the like.

It can be understood that, a structure illustrated in this embodiment of this application does not constitute a specific limitation on the terminal device 100. In some other embodiments of this application, the terminal device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction reading and instruction execution. For example, the controller may obtain an instruction, triggered by a user by operating an app that is installed in the terminal device 100 and that is used to assist makeup, and execute the instruction, to provide a service of assisting makeup for the user.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency. For example, the memory 110 may store the makeup template information downloaded by the terminal device 100 from the server 200.

A wireless communication function of the terminal device 100 may be implemented by using the antenna 1, the antenna 2, the mobile communication module 130, the wireless communication module 140, the modem processor, the baseband processor, and the like. The terminal device 100 may access the Internet through a wireless communications technology, communicate with the server 200, and download the makeup template information from the server 200.

The antenna 1 and the antenna 2 are configured to transmit and receive an electromagnetic wave signal. Each antenna in the terminal device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 130 may provide a solution that is applied to the terminal device 100 and that includes wireless communications such as 2G, 3G, 4G, and 5G.

The wireless communication module 140 may provide a solution that is applied to the terminal device 100 and that includes wireless communications such as a wireless local area network (wireless local area networks, WLAN) (for example, a wireless fidelity (wireless fidelity, Wi-Fi) network). The terminal device 100 may access the Internet by using the wireless communication module 140, and communicate with the server 200.

In some embodiments, the antenna 1 of the terminal device 100 is coupled to the mobile communication module 130, and the antenna 2 is coupled to the wireless communication module 140, so that the terminal device 100 can communicate with a network and another device through a wireless communications technology. For example, the terminal device 100 may communicate with the network and the server 200 through the wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), WLAN, and the like. The terminal device 100 implements a display function by using the GPU, the touch display screen 160, the application processor, and the like. The GPU is a microprocessor for image processing, and is connected to the touch display screen 160 and the application processor. The GPU is configured to: perform mathematical and geometric computation, and render an image. The processor 110 may include one or more GPUs, which execute program instructions to generate or change display information.

The touch display screen 160 is configured to display an image, a video, or the like. The touch display screen 160 includes a display panel. The display panel may use a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the terminal device 100 may include one or N touch display screens 160, where N is a positive integer greater than 1. For example, the touch display screen 160 may be configured to display a face image of the user that is collected by the camera 170, configured to display a makeup effect image and a makeup contour that are included in the makeup template information downloaded from the server 200, configured to display an image obtained after the makeup contour is superimposed on the face image of the user, and the like.

The terminal device 100 may implement a photographing function by using the ISP, the camera 170, the video codec, the GPU, the touch display screen 160, the application processor, and the like. When the user starts the app used to assist makeup in the terminal device 100, the terminal device 100 may collect the face image of the user by using 170.

The ISP is configured to process data fed back by the camera 170. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 170.

The camera 170 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal device 100 may include one or N cameras 170, where N is a positive integer greater than 1.

The digital signal processor is configured to process a digital signal, and may process another digital signal in addition to the digital image signal. For example, when the terminal device 100 selects a frequency, the digital signal processor is configured to perform Fourier transform on frequency energy.

The video codec is configured to compress or decompress a digital video. The terminal device 100 may support one or more types of video codecs. In this way, the terminal device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the terminal device 100, for example, image recognition, face recognition, speech recognition, and text understanding, can be implemented by using the NPU.

The memory 120 may be configured to store computer-executable program code. The executable program code includes instructions. The memory 120 may include a program storage area and a data storage area. The program storage area may store an operating system, an application needed by at least one function (for example, a voice playing function or an image playing function), and the like. The data storage area may store data (such as audio data, a phone book, and makeup template information) created in a process of using the terminal device 100, and the like. In addition, the memory 120 may include a high-speed random access memory, and may further include a non-volatile memory, for example, at least one magnetic disk storage device, a flash memory device, or a universal flash storage (universal flash storage, UFS). The processor 110 runs the instructions stored in the memory 120 and/or the instructions stored in the memory disposed in the processor, to perform various functional applications and data processing of the terminal device 100, for example, functions and data processing related to makeup assisting.

The terminal device 100 may implement an audio function by using the audio module 150, the speaker 150A, the receiver 150B, the microphone 150C, the application processor, and the like, for example, music playback and recording. For another example, when the user performs makeup by using an app having a makeup assisting function, the terminal device 100 may further broadcast makeup guide information, correction prompt information, and the like by using the audio module 150.

The audio module 150 is configured to convert digital audio information into an analog audio signal for output, and is also configured to convert an analog audio input into a digital audio signal. The audio module 150 may be further configured to encode and decode an audio signal. In some embodiments, the audio module 150 may be disposed in the processor 110, or some function modules of the audio module 150 are disposed in the processor 110.

The speaker 150A, also referred to as a "loudspeaker", is configured to convert an audio electrical signal into a sound signal. The terminal device 100 may be configured to listen to music or voice prompt information, or answer a call in a hands-free mode over the speaker 150A.

The receiver 150B, also referred to as an "earpiece", is configured to convert an audio electrical signal into a sound signal. When the terminal device 100 answers a call or receive voice information, the receiver 150B may be placed close to a human ear to listen to a voice.

The microphone 150C, also referred to as a "mike" or a "mic", is configured to convert a sound signal into an electrical signal. When making a call or sending voice information, a user may make a sound near the microphone 150C through the mouth of the user, to input a sound signal to the microphone 150C. The terminal device 100 may be provided with at least one microphone 150C. In some other embodiments, two microphones 150C may be disposed in the terminal device 100, to collect a sound signal and further implement a noise reduction function. In some other embodiments, three, four, or more microphones 150C may be alternatively disposed in the terminal device 100, to collect a sound signal, implement noise reduction, and recognize a sound source, to implement a directional recording function and the like.

As shown in FIG. 1, the server 200 may be a physical server or a cloud server, or may be a cluster. This is not limited herein. The server 200 may include a processor 210, a memory 220, a communication module 230, and a database 240. The memory 220 may be configured to store computer-executable program code. The executable program code includes instructions, and the processor 210 executes, by running the instructions stored in the memory 220, a function and data processing that are related to makeup assisting. The server 200 may communicate with the terminal device 100 by using the communication module 230, to provide a related service for the app that can implement the makeup assisting. The database 240 may be configured to store data, for example, may be configured to store a makeup template library. The makeup template library may include a plurality of pieces of makeup template information. It should be noted that, in this embodiment, the database 240 exists in the server 200. In some embodiments, the database 240 may also exist in another device, and the server 200 may obtain the makeup template library from the database of the another device, to obtain the makeup template information in the makeup template library. Alternatively, the server 200 may obtain the makeup template information in the makeup template library from the database of the another device.

Figure 2:
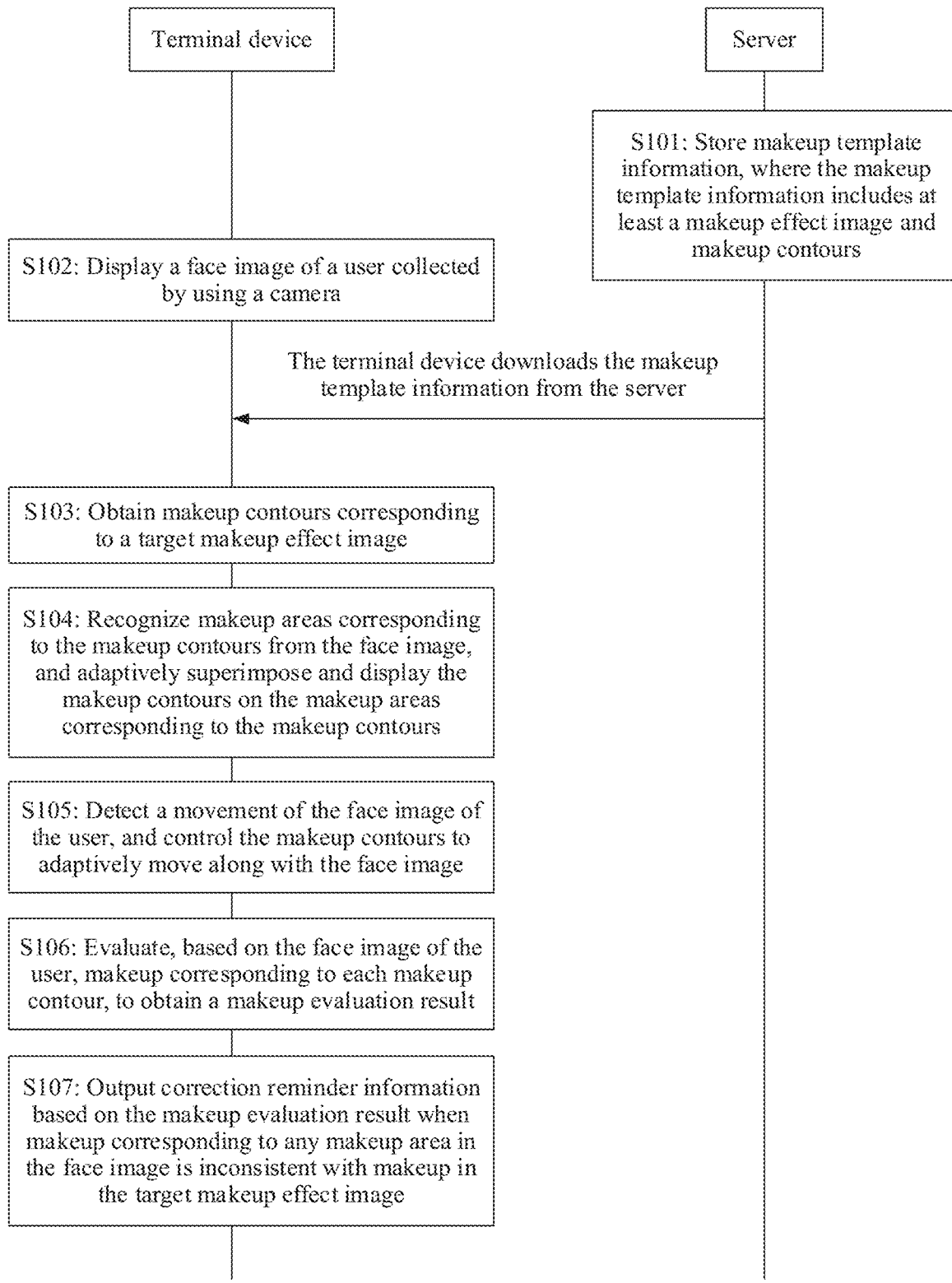
FIG. 2 is an interaction diagram of a method for assisting makeup according to an embodiment of this application.

After the makeup assisting system is described, the following describes in detail a specific implementation process of assisting a user in makeup with reference to FIG. 2. FIG. 2 is an interaction diagram of a method for assisting makeup according to an embodiment of this application. In this embodiment, the method for assisting makeup may be applied to the terminal device shown in FIG. 1, and the terminal device includes but is not limited to a mobile phone. The method for assisting makeup in this embodiment may assist the user in drawing eyebrows, performing painting with an eye shadow, a blusher and a lipstick, and the like. The following uses an example in which the terminal device is a mobile phone and assists the user in drawing the eyebrows for detailed description. The method for assisting makeup includes the following steps.

S101. A server stores makeup template information, where the makeup template information includes at least a makeup effect image and a makeup contour.

The server may store the makeup template information in a makeup template library of a database. The makeup template information may be set by an administrator, or may be generated by the server based on a makeup effect image uploaded by the terminal device. This is not limited herein. The makeup effect image uploaded by the terminal device may be from a makeup magazine, or may be shot by the user, for example, a makeup effect image shot when the user watches a video or a TV show, or a makeup effect image shot by the user by street snap. The makeup template information includes at least a makeup effect image and a makeup contour.

A method for generating the makeup template information based on the makeup effect image uploaded by the terminal device may be as follows: The server obtains the makeup effect image uploaded by the terminal device, recognizes parts such as eyes, eyebrows, and a mouth in the makeup effect image based on a face recognition technology, extracts makeup contours respectively corresponding to makeup effect images of the parts such as the eyes, the eyebrows, and the mouth, and stores the makeup effect images and the makeup contours corresponding to the makeup effect images in an associated manner, to obtain the makeup template information.

The makeup effect image is a post-makeup face image. The makeup effect image is an image obtained after makeup is performed on a sample face globally, or an image obtained after makeup is performed on some areas of the sample face. When the makeup effect image is the image obtained after makeup is performed on the sample face globally, makeup effect images may be classified according to styles, for example, daily makeup, holiday makeup (for example, Christmas makeup and Halloween makeup), and banquet makeup. The makeup effect images may also be makeup effect images that correspond to different styles and that are further set by the administrator in view of different facial features.

When the makeup effect image may be the image obtained after makeup is performed on some areas of the sample face, makeup effect images are classified according to makeup types, for example, lip makeup, eyebrow makeup, eye shadow makeup, and blush makeup. The makeup effect images can be divided into an eyebrow makeup effect image, an eye shadow makeup effect image, a lip makeup effect image or a blush effect image according to makeup types. Makeup effect images of each makeup type may be classified into a plurality of makeup effect images according to makeup styles. To be specific, different makeup types may further include different makeup styles. For example, an eyebrow makeup style may include a "minus-shaped eyebrow", a "flat eyebrow", an "arched eyebrow", and the like. Correspondingly, the eyebrow makeup effect image may include an effect image of a "minus-shaped eyebrow", an effect image of a "flat eyebrow", and an effect image of an "arched eyebrow".

The makeup contours refer to reference lines or reference areas that are set for different makeup types. For example, an eyebrow makeup contour may be an eyebrow contour drawn based on an eyebrow radian corresponding to the eyebrow makeup style. The eyebrow contour includes an eyebrow head, an eyebrow peak, and an eyebrow tail of an eyebrow. The eyebrow makeup contour is used to help the user draw the eyebrow in a manner of facing the eyebrow makeup contour. An eye shadow contour may be an area that needs to be painted with an eye shadow and that is drawn on an eye part of a sample face image based on a reference line. A blush contour may be an area that needs to be painted with a blusher and that is drawn on a face in the sample face image based on a reference line. A lip makeup contour may be an area that needs to be painted with a lipstick and that is drawn based on a reference line and by using a shape of a lip in the sample face image. It should be noted that the eye shadow contour and the blush contour may include a plurality of areas.

It may be understood that, when the makeup effect image is for a specific part of the face, one makeup effect image corresponds to one makeup contour. When the makeup effect image is for a plurality of parts or an entire face of the user, one makeup effect image corresponds to a plurality of different makeup contours. For example, one makeup effect image may correspond to the eyebrow makeup contour, the eye shadow contour, the lip makeup contour, the blush contour, and the like. The eyebrow makeup contour includes a left eyebrow makeup contour and a right eyebrow makeup contour. The eye shadow contour may include a left eye shadow contour and a right eye shadow contour.

Optionally, the makeup template information may further include makeup guide information. Both the makeup contour and the makeup instruction information are associated with the makeup effect image.

The makeup guide information corresponding to the makeup effect image is used to guide the user to make up makeup corresponding to the makeup effect image. The makeup guide information of the makeup effect image may include color information corresponding to the makeup contour, and may further include information about a makeup tool, cosmetics, and the like. For example, when the makeup effect image is the eyebrow makeup effect image, makeup guide information corresponding to the eyebrow makeup effect image may include color information (for example, dark black and brown) used to make up eyebrow makeup in the eyebrow makeup effect image, and may further include makeup tool information and cosmetic information that are needed for making up the eyebrow makeup. The makeup guide information corresponding to the makeup effect image may be displayed in a text form, or may be displayed in a form of a combination of text and graphics, or may be broadcast by voice. This is not limited herein.

It may be understood that, when the eye shadow contour and the blush contour include the plurality of areas, makeup guide information corresponding to each of the eye shadow contour and the blush contour further includes color information corresponding to each area.

S102: The terminal device displays a face image of the user collected by a camera.

The user taps an icon of an app with a makeup assisting function in the terminal device. The terminal device starts the app, starts the camera to collect the face image of the user, and displays the collected face image on a corresponding user interface. The app may be an app used to assist makeup, or may be an existing app to which the makeup assisting function is added, for example, a photographing app or an image processing app. The app may be downloaded and installed by the user, or may be an app preset in the terminal device.

In this embodiment, the user refers to a user who needs makeup. The face image may be a natural image before makeup, or may be an image collected in a makeup process. Usually, after primer makeup is made up, eye makeup making-up (for example, drawing eyebrows and performing painting with an eye shadow), blusher painting, lipstick painting, or the like are further needed. Therefore, the image collected in the makeup process may also be an image obtained after the user completes the primer makeup. The image obtained after the user completes the primer makeup is an image obtained after the user completes painting with a foundation primer, a liquid foundation, and finishing powder after basic skin caring.

When the terminal device has a built-in camera, the face image of the user is collected by the built-in camera. When the user performs makeup by the user, the face image may be collected by a built-in front-facing camera. When makeup is performed on another person, a face image of a user who needs makeup may be collected by a rear-facing camera.

When an external camera is connected to the terminal device, the face image of the user may be collected by the external camera. S103: The terminal device obtains makeup contours corresponding to a target makeup effect image.

The target makeup effect image may be a makeup effect image selected by the user, or may be a makeup effect image that is intelligently recommended by the terminal device to the user based on a face image of the user by using an artificial intelligence technology. It should be noted that a mobile phone can obtain makeup contours corresponding to a makeup effect image that is manually selected by the user from a user interface, or can obtain the makeup contours corresponding to the target makeup effect image based on a voice message entered by the user.

The makeup effect image is a post-makeup image. The makeup effect image may be obtained from a local database of the terminal device. When there is no makeup effect image in the local database of the terminal device, the makeup template information may be downloaded from the server, and the makeup effect image included in the downloaded makeup template information is obtained. It should be noted that the makeup contours corresponding to the makeup effect image may be downloaded from the server. Alternatively, the terminal device may extract the makeup contours from the makeup effect image by using an image recognition technology or a related image processing algorithm. When the user selects a makeup effect image for the first time, the terminal device may download, from a makeup template database of the server, the makeup contours corresponding to the makeup effect image, and save the makeup contours for next selection.

Specifically, the terminal device may display corresponding options on the user interface that displays the face image of the user, for example, "intelligently recommend a makeup effect image" and "user selects a makeup effect image", so that the user selects the "intelligently recommend a makeup effect image" or the "user selects a makeup effect image". Then, the terminal device may obtain the target makeup effect image based on an option selected by the user, and obtain the makeup contours corresponding to the target makeup effect image.

When the user selects the "intelligently recommend a makeup effect image", the terminal may recommend the target makeup effect image to the user by using the artificial intelligence technology, and obtain the makeup contours corresponding to the target makeup effect image. The terminal device may intelligently recommend one or at least two makeup effect images to the user. This is not limited herein.

When the user selects the "user selects a makeup effect image", the terminal device may obtain and display makeup effect images based on an option selected by the user, so that the user autonomously selects a required target makeup effect image from the makeup effect images. When detecting the target makeup effect image selected by the user, the terminal device may obtain makeup contours corresponding to the target makeup effect image.

With reference to the accompanying drawings, the following describes in detail a specific implementation in which the terminal device obtains the target makeup effect image.

Figure 3A:
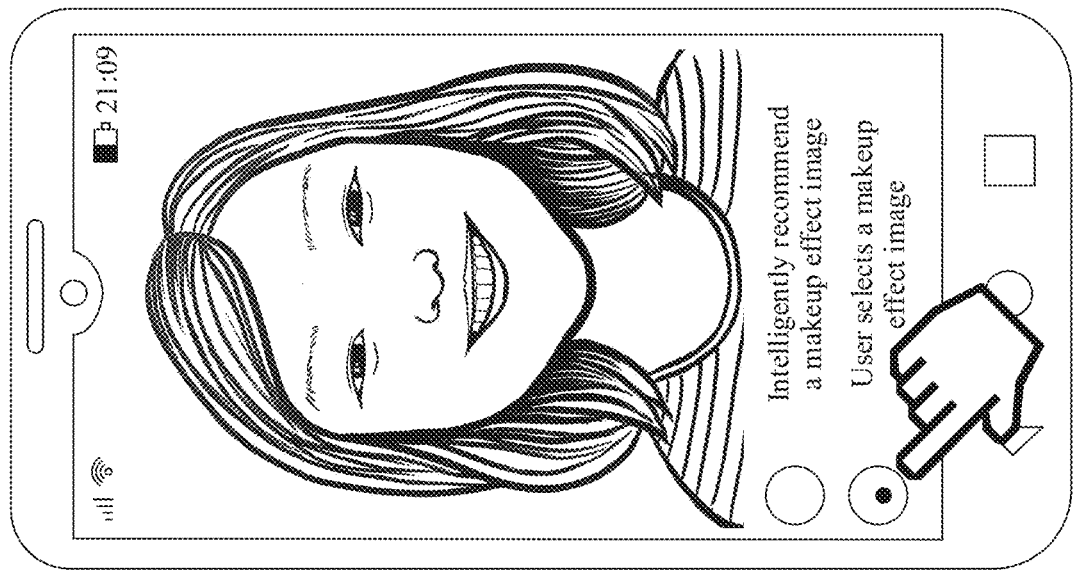
Figure 3B:
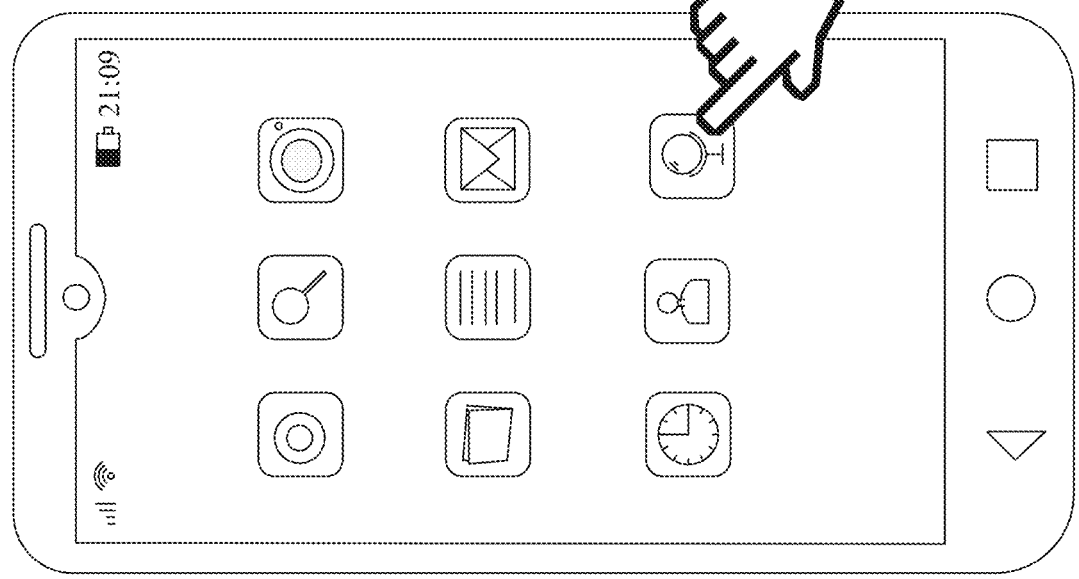

For example, refer to FIG. 3A to FIG. 3D, when the user needs makeup, the user may tap an app, for example, a mirror app, that has a makeup assisting function in FIG. 3A. The mobile phone starts the mirror app, obtains a face image of the user collected by a built-in camera of the mobile phone, and displays a user interface (User Interface, UI) shown in FIG. 3B, so that the user selects the "intelligently recommend a makeup effect image" or the "user selects a makeup effect image".

If the mobile phone detects that the user selects the option, namely, the "user selects a makeup effect image", the mobile phone may display a UI interface shown in FIG. 3C, to display a makeup type that can be selected by the user. The makeup type that can be selected may include eyebrow makeup, eye shadow makeup, face makeup, overall makeup for an entire face, and the like. When detecting that the user selects the "eyebrow makeup", the mobile phone may obtain, from a local database used to save the makeup template information, target makeup template information corresponding to the "eyebrow makeup". When the mobile phone does not find the target makeup template information in the local database, the mobile phone may send, to the server, request information that includes a target makeup template type, to download the target makeup template information from the server, to obtain a target makeup effect image included in the target makeup template information. When finding the target makeup template information in the local database, the mobile phone does not need to download the target makeup template information from the server.

When obtaining the target makeup template information corresponding to the "eyebrow makeup", the mobile phone may display a UI interface shown in FIG. 3D, to display eyebrow makeup effect images included in the target makeup template information corresponding to the "eyebrow makeup", so that the user selects a required target eyebrow makeup effect image from the header makeup effect images. When the mobile phone detects that the user selects a "minus-shaped eyebrow" in FIG. 3D, the mobile phone obtains a makeup contour corresponding to the "minus-shaped eyebrow".

If the mobile phone detects that the user selects the "intelligently recommend a makeup effect image", the mobile phone may display a UI interface shown in FIG. 3C, to display a makeup type that can be selected by the user. When the mobile phone detects that the user selects the "eyebrow makeup", the mobile phone may search, by using the face recognition technology, a face database for a target face image that is most similar to the obtained face image of the user, obtain, based on a preset correspondence between the face image and eyebrow makeup template information, target eyebrow makeup template information corresponding to the target face image, and display target eyebrow makeup effect images included in the target eyebrow makeup template information, to intelligently recommend an eyebrow makeup effect image to the user. When the target makeup template information is not obtained from the local database, the face image of the user may be sent to the server, so that after receiving the face image of the user, the server may obtain, from the database based on the preset correspondence between the face image and the makeup template information, the target makeup template information corresponding to the face image of the user displayed in S101.

It should be noted that, when detecting that the user selects the "intelligently recommend a makeup effect image", the mobile phone may further recommend, to the user based on the face image of the user and by using the face recognition technology, the target makeup effect image corresponding to overall makeup for an entire face, and obtain makeup contours corresponding to the target makeup effect image.

Figure 3E:
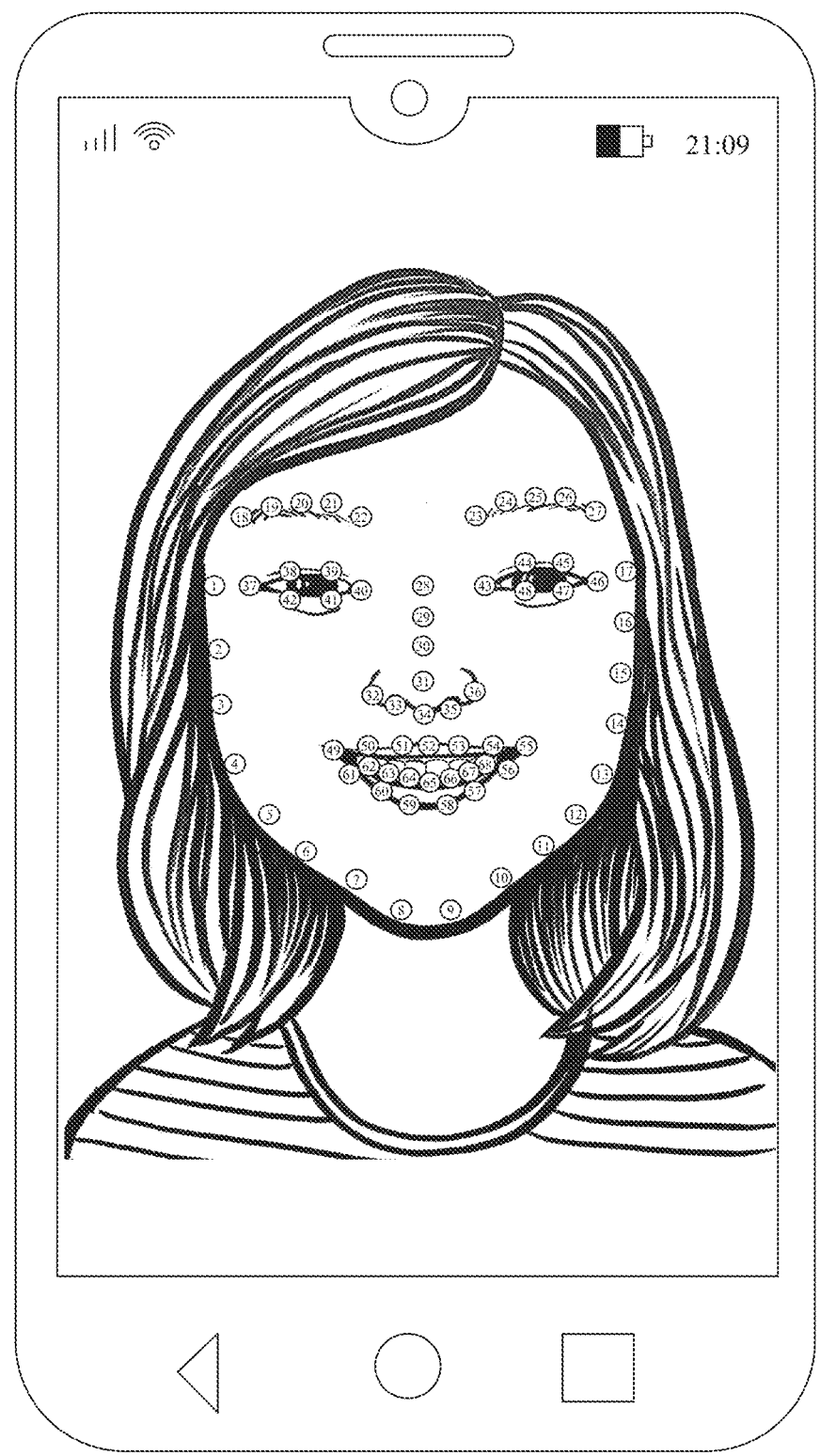
FIG. 3E is a schematic diagram of face feature points of a user according to an embodiment of this application.
Figure 3F:
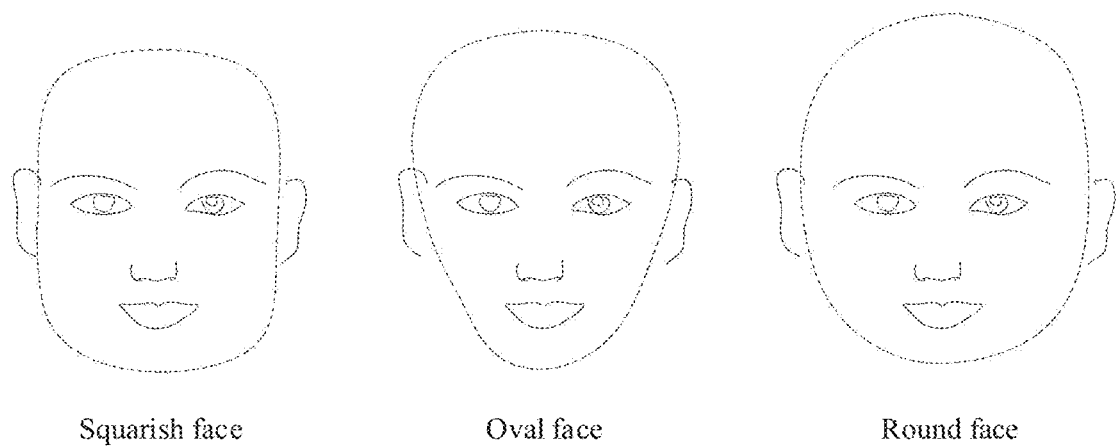
FIG. 3F is a schematic diagram of face shapes according to an embodiment of this application.
Figure 3G:
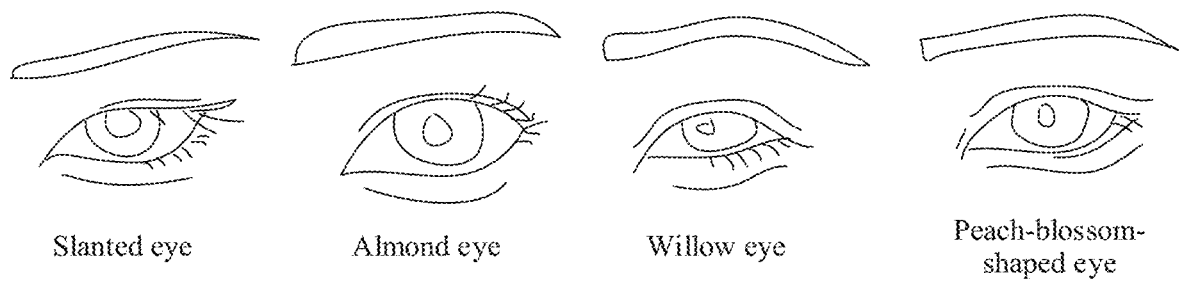
FIG. 3G is a schematic diagram of eye shapes according to an embodiment of this application.

A specific implementation in which the mobile phone recommends, to the user, the target makeup effect image corresponding to the overall makeup for the entire face, and obtains the makeup contours corresponding to the target makeup effect image may be as follows: The face image of the user is analyzed by using the face recognition technology, to recognize face feature points of the user. As shown in FIG. 3E, 68 face feature points of the user are recognized, and a face contour of the user and a shape of an eye, a mouth, a nose, an eyebrow, and the like of the user are determined based on the face feature points of the user, to determine a facial feature of the user. A makeup effect image that matches the facial feature of the user is obtained based on a preset correspondence between a face feature and a makeup effect image. The facial feature of the user includes but is not limited to a face type, an eye type, an eyebrow shape, and the like of the user. The face type is determined based on a face contour in the face image, and the face type may include but is not limited to an oval face, a round face, and a squarish face shown in FIG. 3F. The eye type is determined based on an eye shape, and the eye type includes but is not limited to a peach-blossom-shaped eye, a willow eye, an almond eye, and a slanted eye shown in FIG. 3G.

Optionally, to help the user make up makeup that is the same as or more similar to the makeup in the makeup effect image, the terminal device may further download, from the server, makeup guide information corresponding to the target makeup effect image and save the makeup guide information corresponding to the target makeup effect image. The makeup guide information may be used to describe color information corresponding to each makeup contour in the target makeup effect image. For example, makeup guide information corresponding to an eyebrow makeup contour is used to describe that a color of an eyebrow tail is lighter than a color of an eyebrow head.

It should be noted that the eyebrow makeup contour may be divided into two areas, an eyebrow peak may be located at a junction of the two areas, and the makeup guide information corresponding to the eyebrow makeup contour is used to describe that a color of an area including an eyebrow start point is deeper than a color of an area including an eyebrow end point.

S104: Recognize makeup areas corresponding to the makeup contours from the face image, and adaptively superimpose and display the makeup contours on the makeup areas corresponding to the makeup contours, to assist the user in makeup.

The terminal device analyzes the face image of the user by using the face recognition technology, recognizes the face feature points of the user, for example, the 68 face feature points shown in FIG. 3E, and recognizes a face contour, eyebrows, eyes, a mouth, a nose, cheeks, and the like in the face image of the user based on the recognized face feature points. Then, the makeup areas corresponding to the makeup contours are determined based on the makeup contours, then the makeup contours are superimposed on the makeup areas corresponding to each makeup contour, and a face image obtained after the makeup contour is superimposed is displayed, so that the user performs makeup in a manner of facing the face image obtained after the makeup contour is superimposed. In this case, it is equivalent to that the user performs makeup in a manner of facing an image presented by a mirror. For example, corresponding cosmetics are used to draw the face or fill different colors in the makeup contour based on the superimposed makeup contour.

It may be understood that, in a contour superimposing process, the terminal device can zoom in or zoom out the makeup contour based on an actual requirement, to match a facial feature (for example, an eyebrow shape, an eye shape, a mouth shape, or a face shape) of the user. The terminal device may further provide a corresponding entry for the user to edit the makeup contour or adjust a size and a location of the makeup contour.

A makeup area corresponding to the eyebrow makeup contour is an eyebrow area in the face image of the user. A makeup area corresponding to the eye shadow contour may be an eye shadow area, and the eye shadow area may be a location of an eyelid in the face image of the user. A makeup area corresponding to the lip makeup contour is an area in which a lip is located in the face image of the user. A makeup area corresponding to the blush contour may be a cheek area in the face image of the user, or may be an area in which cheekbone is located. The makeup area corresponding to the blush contour may be a circle or an ellipse centered on a highest part of the cheekbone (a raised part of the cheekbone is used as a center when smiling).

Figure 3I:
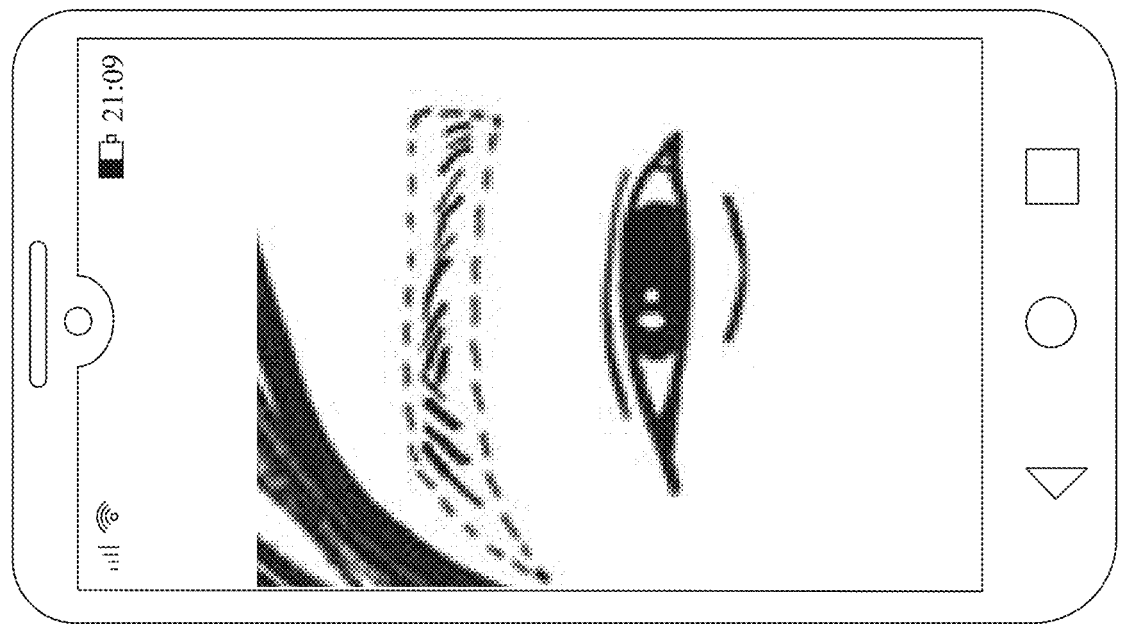
Figure 3H:
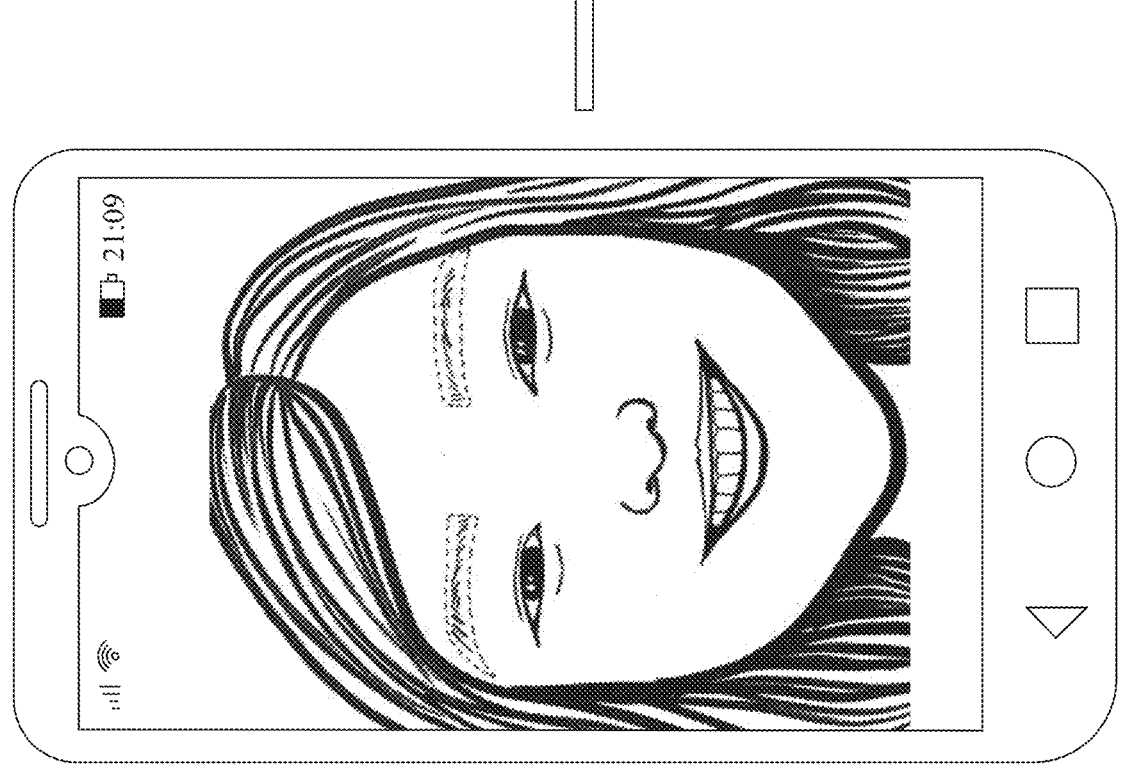
FIG. 3H is an image in which an eyebrow contour is displayed in a superimposed manner according to an embodiment of this application.

For example, when the makeup contour obtained in S103 is an eyebrow contour, the terminal device first recognizes, by using the face recognition technology, an eyebrow area in the face image of the user, recognizes an eyebrow head and an eyebrow tail of an eyebrow in the eyebrow area, and then adaptively superimposes, based on a location of the eyebrow head and a location of the eyebrow tail in the face image of the user, an eyebrow contour corresponding to the "minus-shaped eyebrow" on areas in which eyebrows in the face image of the user are located. FIG. 3H is an effect diagram in which the eyebrow contour is superimposed on the face image of the user. After the terminal device superimposes the eyebrow contour on the areas in which the eyebrows in the face image of the user are located, as shown in FIG. 3I, an area obtained after the eyebrow contour is superimposed may be zoomed in and displayed, so that the user makes up eyebrow makeup in a manner of facing a face image obtained after the eyebrow makeup contour is superimposed. For example, an eyebrow pencil or eyebrow powder is used to draw the eyebrow makeup contour, and color the eyebrow makeup contour. The terminal device may fix an eyebrow head in the eyebrow makeup contour at a location of the eyebrow head in the face image of the user, and fix an eyebrow tail in the eyebrow makeup contour at a location of the eyebrow tail in the face image of the user, or fix an eyebrow tail in the eyebrow makeup contour at a location of an extension line of the eyebrow tail in the face image of the user.

A method for recognizing the eyebrow head and the eyebrow tail in the face image of the user is specifically as follows. The terminal device may determine a straight line based on a first location of an eye corner and a second location of a nasal ala, and recognize an intersection point of the straight line and the eyebrow as the eyebrow head. The terminal device determines a straight line based on a third location of an eye tail and the second location of the nasal ala, and recognizes an intersection point of the straight line and the eyebrow as the eyebrow tail.

It should be noted that, when detecting that the user makes up eyebrow makeup, the terminal device may broadcast, by voice, the makeup guide information corresponding to the eyebrow makeup contour. Alternatively, makeup guide information corresponding to the eyebrow makeup is displayed on the user interface. When it is detected that the user completes making up of the eyebrow makeup, the makeup guide information corresponding to the eyebrow makeup is hidden.

In this solution, the terminal device may obtain the face image of the user, and obtain the makeup contours corresponding to the target makeup effect image selected by the user, or recommend the target makeup effect image to the user based on the face image of the user by using the artificial intelligence technology and the face recognition technology, and obtain the makeup contour corresponding to the target makeup effect image. The makeup contours corresponding to the target makeup effect image are superimposed and displayed on the corresponding makeup area in the face image of the user, so that the user performs makeup based on the makeup contour. This manner for assisting makeup based on the makeup contour can provide effective makeup reference for the user in a makeup process of the user, and improve a makeup skill of the user, so that the user can make up makeup that is similar to or the same as makeup in the makeup effect image selected by the user.

Optionally, because a location of a face of the user may change in the makeup process, when the face of the user moves, the face image displayed by the terminal moves as the face of the user moves. To avoid that the user cannot accurately perform makeup on the corresponding makeup area based on the makeup contour because the makeup contour and the corresponding makeup area are in different locations due to head turning of the user, after S104, the method may further include S105: detect a movement of the face image of the user, and control the makeup contour to adaptively move along with the face image.

When detecting that the face image of the user moves, the mobile phone may control the makeup contour superimposed and displayed on the face image to adaptively move along with the face image of the user, to ensure that the makeup contour is always superimposed and displayed on the corresponding makeup area.

Specifically, after displaying the makeup contour on the corresponding makeup area in the face image of the user in a superimposed manner, the mobile terminal detects, by using the face recognition technology and a face tracking technology, whether the face image changes. Specifically, whether positions of a same face feature point in face images obtained at two adjacent moments change may be compared, to determine whether the face image of the user changes. When the positions of the same face feature point in the face images obtained at the two adjacent moments are different, the face image of the user changes, and the face image moves. When the positions of the same face feature point are the same, the face image of the user does not change, and the face image does not move. When determining that the face image of the user moves, the terminal device redetermines, based on the method in S104, a makeup area corresponding to the makeup contour, and superimposes each makeup contour on the makeup area corresponding to each makeup contour. For details, refer to related descriptions in S104. Details are not described herein again. For example, when detecting, by using the face recognition technology, that a location of a feature point in the face feature points 37 to 46 in FIG. 3E in the face image of the user at a first moment is different from a location of the feature point at a second moment, the mobile phone determines that the location of the face image of the user changes. In this case, the mobile phone re-recognizes an eyebrow area, and displays the eyebrow makeup contour corresponding to the "minus-shaped eyebrow" on the re-recognized eyebrow area.

Optionally, to enable the user to more accurately make up makeup that is the same as makeup in a makeup effect image, in a process in which the user performs makeup based on any makeup contour, or when the makeup is completed, the terminal device may evaluate a makeup effect of the face image of the user, to determine whether a current makeup is consistent with the makeup in the target makeup effect image determined in S103, to resolve a problem that a current makeup application does not evaluate a makeup effect of a face image of a user, and cannot provide a correction prompt. Specifically, after S104 or S105, the method may further include S106 to S107.

S106: Evaluate, based on the face image of the user, makeup corresponding to each makeup contour, to obtain a makeup evaluation result.

S107: Output correction reminder information based on the makeup evaluation result when makeup corresponding to any makeup area in the face image is inconsistent with makeup in the target makeup effect image.

The terminal device may automatically start makeup evaluation in the makeup process of the user, or may start the makeup evaluation when detecting that the user triggers a makeup evaluation request through the user interface of the app. For example, the terminal device starts the makeup evaluation when detecting that the user taps an "evaluation and correction button" displayed on the user interface of the app.

The terminal device obtains the face image of the user in the makeup process, detects whether the makeup of each makeup area in the face image exceeds a makeup contour, and may further detect whether an actual color inside each makeup contour is consistent with a corresponding preset color inside each makeup contour in the target makeup effect image. When it is detected that no makeup made up by the user exceeds the makeup contour, and the actual color inside the makeup contour is consistent with the preset color, it is considered that the current makeup is consistent with the makeup in the target makeup effect image. When it is detected that makeup made up by the user exceeds any makeup contour, or an actual color inside any makeup contour is inconsistent with a preset color, it is considered that the current makeup is inconsistent with the makeup in the target makeup effect image, and the terminal device may output corresponding prompt information and/or a correction solution based on a makeup evaluation result, so that the user makes a correction. By constantly correcting the makeup, the makeup can gradually approach the makeup in the target makeup effect image.

A method for detecting whether the makeup of each makeup area in the face image exceeds the makeup contour may include: obtaining information about an actual color outside the makeup contour of each makeup area in the face image of the user, obtaining information about a preset color outside a makeup contour in the target makeup effect image, and separately comparing the information about the actual color and the information about the preset color outside a same makeup contour. When the information about the actual color and the information about the preset color outside a same makeup contour are consistent, the makeup of the makeup area in the face image does not exceed the makeup contour. When the information about the actual color and the information about the preset color outside a same makeup contour are inconsistent, the makeup of the makeup area in the face image exceeds the makeup contour.

The information about the actual color and the information about the preset color may be specific color values, or may be color value ranges, and the color values are usually represented by tricolor (RGB) values. When the information about the preset color outside a same makeup contour is a specific color value, if an actual color value is the same as a preset color value, the information about the actual color and the information about the preset color outside the makeup contour are consistent. If an actual color value is different from a preset color value, the information about the actual color and the information about the preset color outside the makeup contour are inconsistent.

When the information about the preset color outside a same makeup contour is a specific color value range, if an actual color value or an actual color value range outside the same makeup contour belongs to a preset color value range, it is considered that the information about the actual color and the information about the preset color outside the makeup contour are consistent. If an actual color value or an actual color value range outside the same makeup contour does not belong to a preset color value range, it is considered that the information about the actual color and the information about the preset color outside the makeup contour are inconsistent. The actual color value or actual color value range outside a same makeup contour is determined by an actual color value of each pixel outside the makeup contour.

In a possible implementation, the obtaining information about an actual color outside the makeup contour of each makeup area in the face image may be specifically: determining an actual contour area and a contour determining area that correspond to each makeup contour, where the actual contour area includes the makeup contour, and the contour determining area is obtained after the actual contour area is zoomed in based on a preset proportion. A color of an area other than the actual contour area in the contour determining area corresponding to each makeup contour is used as the actual color outside the makeup contour.

Figure 4:
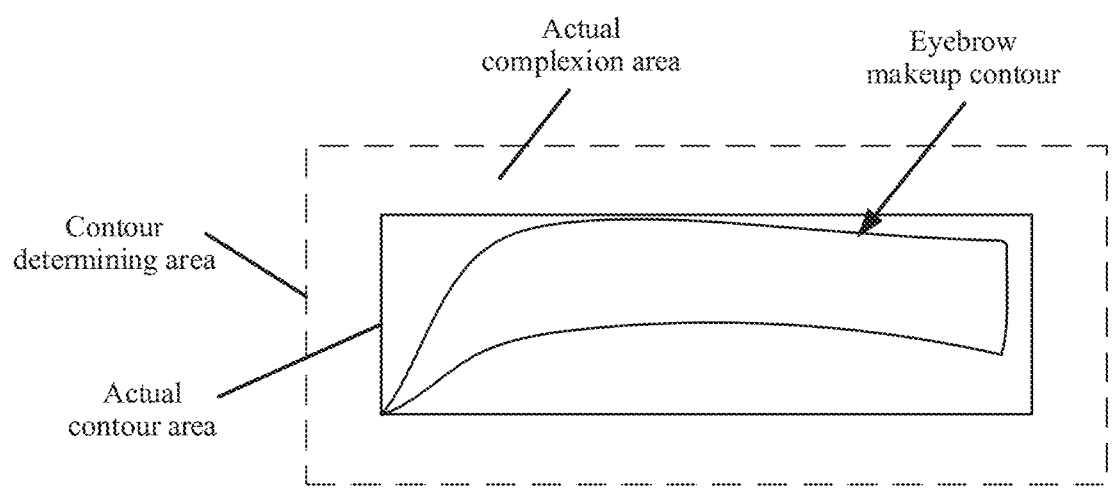
FIG. 4 is an example diagram of assisting a user in makeup according to an embodiment of this application.

For example, FIG. 4 is an example diagram of assisting a user in makeup according to an embodiment of this application. FIG. 4 shows an actual contour area and a contour determining area that correspond to an eyebrow makeup contour. An area other than the actual contour area in the contour determining area is an actual complexion area of a currently obtained face image, and a color corresponding to the actual complexion area is an actual color outside the eyebrow makeup contour.

A method for detecting whether a color inside each makeup contour is consistent with a corresponding color inside each makeup contour in the target makeup effect image may be specifically: obtaining information about an actual color inside a makeup contour of each makeup area in the face image, obtaining information about a preset color inside a makeup contour in the target makeup effect image, and separately comparing the information about the actual color and the information about the preset color inside a same makeup contour, to determine whether the information about the actual color and the information about the preset color inside the same makeup contour are consistent. A method for determining whether the information about the actual color and the information about the preset color inside a makeup contour are consistent is the same as the foregoing method for determining whether the information about the actual color and the information about the preset color outside a makeup contour are consistent. Details are not described herein again.

The following describes, with reference to a specific application scenario, how the terminal device performs makeup evaluation and how the terminal device provides a correction reminder based on a makeup evaluation result.

For example, in an eyebrow makeup make-up process of the user, the mobile phone detects, by using a preset RGB value inside an eyebrow makeup contour corresponding to the "minus-shaped eyebrow" and an actual RGB value in an eyebrow area, whether an eyebrow drawn by the user exceeds an eyebrow makeup contour displayed in a superimposed manner, and may further detect whether a color inside the eyebrow makeup contour is consistent with an eyebrow color corresponding to the "minus-shaped eyebrow" selected by the user. When detecting that an eyebrow drawn by the user exceeds the eyebrow makeup contour, or an actual color of eyebrow makeup made up by the user is different from a preset color corresponding to the "minus-shaped eyebrow", the mobile phone outputs corresponding prompt information and a correction solution, to prompt the user to correct the eyebrow makeup, to ensure that an eyebrow type drawn by the user is the "minus-shaped eyebrow", a color of the made-up eyebrow makeup is the same as the preset color, and the situation that the eyebrow makeup made up by the user is excessively thick or excessively long or is inconsistent with the eyebrow type is avoided.

When the eyebrow drawn by the user exceeds the eyebrow makeup contour, location information (the location information may be pixel coordinates) of a pixel that exceeds the eyebrow makeup contour may be further determined, to further determine, based on the location information of the pixel that exceeds the eyebrow makeup contour, whether the eyebrow drawn by the user is excessively long, excessively thick, a drawn eyebrow peak is excessively high or excessively low, and output corresponding reminder information based on a specific situation. For example, when the eyebrow drawn by the user exceeds an end point of the eyebrow makeup contour, it is determined that the eyebrow drawn by the user exceeds an eyebrow excessively long. In this case, an eye-catching color may be used to mark the end point of the eyebrow makeup contour, to remind the user that the drawn eyebrow is excessively long, or remind the user by voice that the drawn eyebrow is excessively long. When it is detected that a color of a pixel around the eyebrow makeup contour that is superimposed and displayed in the face image is deeper than a color of a pixel outside the eyebrow (for example, a forehead), it is determined that the eyebrow drawn by the user is excessively thick, an eye-catching color may be used to mark an entire eyebrow makeup contour, and the user is reminded by voice that the drawn eyebrow is excessively thick. When it is detected that a highest point of the eyebrow drawn by the user exceeds the eyebrow makeup contour, it is determined that the eyebrow peak drawn by the user is excessively high, and the eyebrow peak (the eyebrow peak refers to the highest point of the eyebrow) of the eyebrow makeup contour may be marked with an eye-catching color. When it is detected that the eyebrow drawn by the user is within the eyebrow makeup contour, and a distance between the highest point of the eyebrow drawn by the user (namely, a highest point in the eyebrow makeup contour) and a highest point of the eyebrow makeup contour is greater than a preset distance threshold, it is determined that the eyebrow peak drawn by the user is excessively low, and the eyebrow peak drawn by the user may be marked with an eye-catching color.

When the eyebrow drawn by the user does not exceed the eyebrow makeup contour, the terminal device may further compare to determine whether a first radian corresponding to the eyebrow makeup contour is the same as or approximately the same as a second radian corresponding to the eyebrow drawn by the user. When the first radian is the same as or approximately the same as the second radian, the terminal device determines that a shape of the eyebrow drawn by the user is consistent with a shape of the eyebrow in the eyebrow makeup effect image. When the eyebrow drawn by the user does not exceed the eyebrow makeup contour, and an actual color in the eyebrow makeup contour is consistent with a preset color corresponding to the eyebrow makeup contour, it is determined that the eyebrow makeup made up by the user is consistent with the eyebrow makeup in the eyebrow makeup effect image. That the first radian and the second radian are approximately the same means that a radian difference between the first radian and the second radian is within a preset error range.

In the foregoing solution, the terminal device obtains the face image of the user in the makeup process, and recognizes colors inside and outside a makeup contour superimposed on the face image, to detect whether the makeup made up by the user exceeds the makeup contour, and detect whether an actual color in the makeup contour is consistent with a preset color corresponding to each makeup contour in the makeup effect image, so as to determine whether the makeup made up by the user is consistent with the makeup in the target makeup effect image, and evaluate accuracy of makeup of the user.

When detecting that the makeup made up by the user exceeds a makeup contour, the terminal device may further mark the makeup contour, and when detecting that an actual color of any area in a makeup contour is inconsistent with a corresponding preset color, mark a makeup color of the area, to remind the user of correction. This implements real-time guidance, real-time evaluation and reminding in the makeup process, so that the user performs correction in a timely manner, and make up the makeup the same as the makeup in the makeup effect image as much as possible.

The foregoing describes in detail a specific implementation process of assisting the user in makeup by using an example of assisting the user in making up the eyebrow makeup. The following describes a method for assisting the user in making up lip makeup, making up blush makeup, and making up eye shadow makeup.

It should be noted that, in embodiments of this application, the method for assisting the user in making up the lip makeup, the blush makeup, and the eye shadow makeup is similar to the method for assisting the user in drawing eyebrows, other than a method for displaying makeup contours corresponding to a target makeup effect image on the face image of the user in a superimposed manner is slightly different, another implementation process is similar. For similar parts, refer to related descriptions of assisting the user in drawing the eyebrows. Details are not described herein again.

When the user is assisted in making up the lip makeup, the blush makeup, and the eye shadow makeup, the method for displaying the makeup contour corresponding to the target makeup effect image on the face image of the user in the superimposed manner is as follows:

When obtaining that makeup contours corresponding to a target lip makeup effect image is a lip makeup contour, the terminal device may use a feature point corresponding to a left mouth corner in the face image of the user and a feature point corresponding to a right mouth corner in the face image as reference points, and superimpose the lip makeup contour to a location of the mouth in the face image, so that the user, in a manner of facing a face image obtained after the lip makeup contour is superimposed, uses a lipstick or lip gloss to draw the lip makeup contour, and color the lip makeup contour.

When the terminal device obtains that makeup contours corresponding to a target eye shadow effect image is an eye shadow contour, because when eye shadow painting is performed, an upper eyelid needs to be smudged upwards from roots of eyelashes to a location that is 1 mm to 2 mm beyond a fold of a double eyelid, and a lower eyelid needs to be smudged downwards from the roots of the eyelashes, the terminal device may determine, based on a location of the eyelashes and a location of the fold of the double eyelid, a makeup area (namely, an eye shadow area) corresponding to the eye shadow contour, and superimpose the eye shadow contour on the makeup area corresponding to the eye shadow contour, so that the user paints the eye shadow contour with an eye shadow in a manner of facing a face image obtained after the eye shadow contour is superimposed.

When the terminal device obtains that makeup contours corresponding to a target blush effect image is a blush contour, the terminal device may use a highest position of cheekbone in the face image as a central point, and superimpose the blush contour to the face image based on the central point, so that a central point of the blush contour is located at the highest position of the cheekbone in the face image, and the user uses a brush to paint the blush contour with a blusher in a manner of facing a face image obtained after the blush contour is superimposed.

It should be noted that the blush contour corresponding to the target blush effect image may include one blush area, or may include at least two blush areas. For example, as shown in FIG. 5A, a blush contour superimposed on a face image of a user includes five blush areas. Makeup guide information corresponding to the blush contour may be used to describe a blush color corresponding to each blush area included in the blush contour. The blush contour may alternatively include one middle area and at least one peripheral area. Makeup guide information corresponding to the blush contour may be used to describe that a blush color of the middle area is deeper than a blush color of the peripheral area. The makeup guide information corresponding to the blush contour may alternatively be used to describe a blush color corresponding to the middle area and a blush color corresponding to the peripheral area.

It should be noted that the eye shadow contour corresponding to the target eye shadow effect image may include a plurality of eye shadow areas. After the terminal device obtains makeup guide information corresponding to the eye shadow effect image, when displaying the obtained eye shadow contour, the terminal device may further display, near the eye shadow contour, the makeup guide information corresponding to the target eye shadow effect image.

Figure 5B:
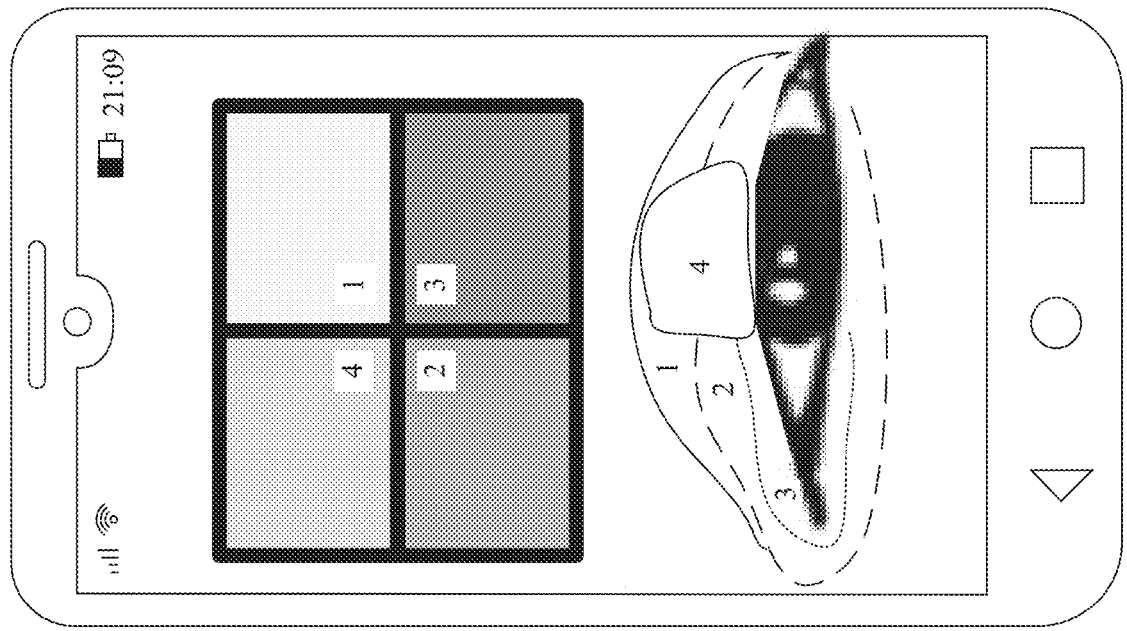
FIG. 5B is a schematic diagram of an image in which an eye shadow contour is displayed in a superimposed manner according to an embodiment of this application.
Figure 5A:
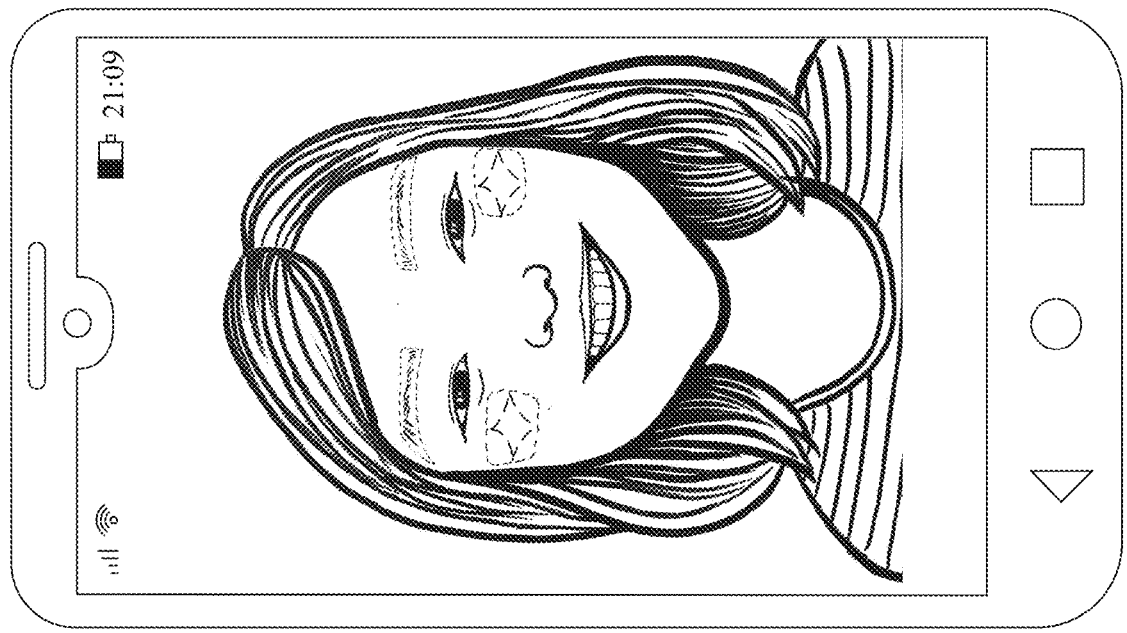
FIG. 5A is a schematic diagram of an image in which a makeup contour is displayed in a superimposed manner according to an embodiment of this application.

For example, in a possible implementation, as shown in FIG. 5B, a terminal device may display an obtained eye shadow contour in an eye area of a user in a superimposed manner. The eye shadow contour includes four areas. Displayed makeup guide information is a schematic diagram of an eye shadow palette. An eye shadow color corresponding to each area in each eye shadow contour is marked in the schematic diagram of the eye shadow palette.

In another possible implementation, an eye shadow contour may alternatively include three areas. Makeup guide information corresponding to the eye shadow contour is used to describe that from an eye corner to an eye tail, an eye shadow color gradually deepens, an eye shadow color in an area where the eye corner is located is lightest, and an eye shadow color in an area where the eye tail is located is darkest. When the three areas are obtained through dividing by two horizontal line segments, the makeup guide information corresponding to the eye shadow contour is used to describe that an eye shadow color gradually becomes lighter from bottom to top, that is, an eye shadow color in an area closest to the eyelashes is darkest, and an eye shadow color in an area farthest from the eyelashes is lightest. The makeup guide information corresponding to the eye shadow contour is used to describe a tone number corresponding to each eye shadow area. The makeup guide information corresponding to the eye shadow contour may describe a color system to which an eye shadow color belongs and a tone number corresponding to each area m a manner of combining text and graphics. For example, when the color system to which the eye shadow color belongs is an earth color system, tone numbers corresponding to the three areas included in the eye shadow contour may be light brown, brown, and brown separately. For example, makeup guide information corresponding to the right eye shadow contour shown in FIG. 3 may be that colors of an eye shadow area are light brown, brown, and brown from left to right in sequence.

It may be understood that, in this embodiment, the eye shadow contour is divided into three or four areas, and in another embodiment, the eye shadow contour may be divided into two or more areas. This may be specifically set according to an actual situation, and is not limited herein.

It should be noted that, when the makeup contour corresponding to the target makeup contour effect image includes a plurality of areas, in this application, the method for assisting the user in making up the eye shadow makeup and the blush makeup and the method for assisting the user in making up the eyebrow makeup are the same. When the makeup corresponding to the makeup contour is evaluated in S106, the terminal device needs to detect whether information about a color in each area of each makeup contour is consistent with a color corresponding to each area of each makeup contour in the makeup effect image. When actual colors of all areas of a makeup contour are consistent with preset colors, a color in the makeup contour is consistent with a color corresponding to the makeup contour in the makeup effect image. When an actual color of any area of a makeup contour is inconsistent with a preset color, an actual color in the makeup contour is inconsistent with a color corresponding to the makeup contour in the makeup effect image.

In S107, a method for outputting correction reminder information based on the makeup evaluation result may be specifically as follows: When makeup in any makeup area exceeds a corresponding makeup contour, the makeup contour or a part of the makeup contour may be marked with a color, to prompt the user to correct the makeup corresponding to the makeup contour. When an actual color of any area in any makeup contour is inconsistent with a preset color corresponding to the makeup contour in the makeup effect image, the area may be marked with an eye-catching color. The terminal device may further remind, by voice, the user of a position that exceeds the makeup contour, and remind the user of an area of which an actual color is inconsistent with a preset color. After the terminal device outputs the correction reminder information, the user continuously corrects based on the correction reminder information, to enable a corrected makeup to gradually approach the makeup in the makeup effect image, and finally makes up makeup that is the same as the makeup in the makeup effect image.

The following describes in detail how the terminal device performs makeup evaluation and provides a correction reminder based on a makeup evaluation result when assisting the user in making up the eye shadow makeup and the blush makeup. When a makeup area is an eye shadow area, the terminal device detects, based on a face image of the user, whether an eye shadow painted by the user in the eye shadow area exceeds an eye shadow contour that is displayed in a superimposed manner, and may further detect whether a color of the eye shadow painted by the user is consistent with a color corresponding to the eye shadow contour. When it is detected in the face image that the eye shadow painted by the user exceeds the displayed eye shadow contour, the user may be reminded by voice, or the eye shadow contour may be marked with an eye-catching color, or location information of a pixel that exceeds the eye shadow contour may be further determined, and an eye shadow contour near the pixel is marked with an eye-catching color based on the location information of the pixel, to facilitate correction by the user.

It is assumed that the eye shadow contour includes three areas: a first area corresponds to a light brown color, a second area corresponds to a brown color, and a third area corresponds to a brown color. A preset color of each area is displayed in the eye shadow makeup effect image, and the terminal device may compare an image of a first area of the eye shadow contour, that is displayed in a superimposed manner, in the face image with an image of a first area in the eye shadow makeup effect image, therefore, to determine whether an actual color of the first area of the eye shadow contour in the face image is the same as a preset color of the first area in the eye shadow makeup effect image. Whether actual colors respectively corresponding to the second area and the third area are the same as preset colors is separately determined by using the same method. When an actual color of any pixel in the first area of the eye shadow contour is different from the preset color corresponding to the first area, the pixel is marked with an eye-catching color, to facilitate the correction by the user.

The terminal device may further obtain an actual RGB value of each area of the eye shadow contour in the face image, obtain a preset RGB value or a preset RGB range of each area in the eye shadow makeup effect image, and compare the actual RGB value corresponding to each area with the preset RGB value or the preset RGB range corresponding to each area, to determine whether the actual RGB value corresponding to each area is the same as the preset RGB value corresponding to the area, or determine whether the actual RGB value corresponding to each area belongs to the preset RGB range corresponding to the area. When the actual RGB value of each area of the eye shadow contour is the same as the preset RGB value corresponding to the area, or the actual RGB value of each area of the eye shadow contour belongs to a respective corresponding preset RGB range, it is considered that an actual color in the eye shadow contour is consistent with a preset color, that is, a color of the eye shadow painted by the user is consistent with a color corresponding to the eye shadow contour.

When a makeup area is a blush area, the terminal device detects, based on a face image of the user, whether an eye shadow painted by the user in the blush area exceeds a blush contour that is displayed in a superimposed manner, and may further detect whether a color of the blush painted by the user is consistent with a color corresponding to the blush contour. A specific method for detecting the blush area is similar to the method for detecting the eye shadow area. Details are not described herein.

It may be understood that, in this embodiment, a shape of each makeup contour may be set based on an actual situation, or each makeup contour may be divided into a plurality of areas based on an actual requirement. This is not limited herein.

Figure 6:
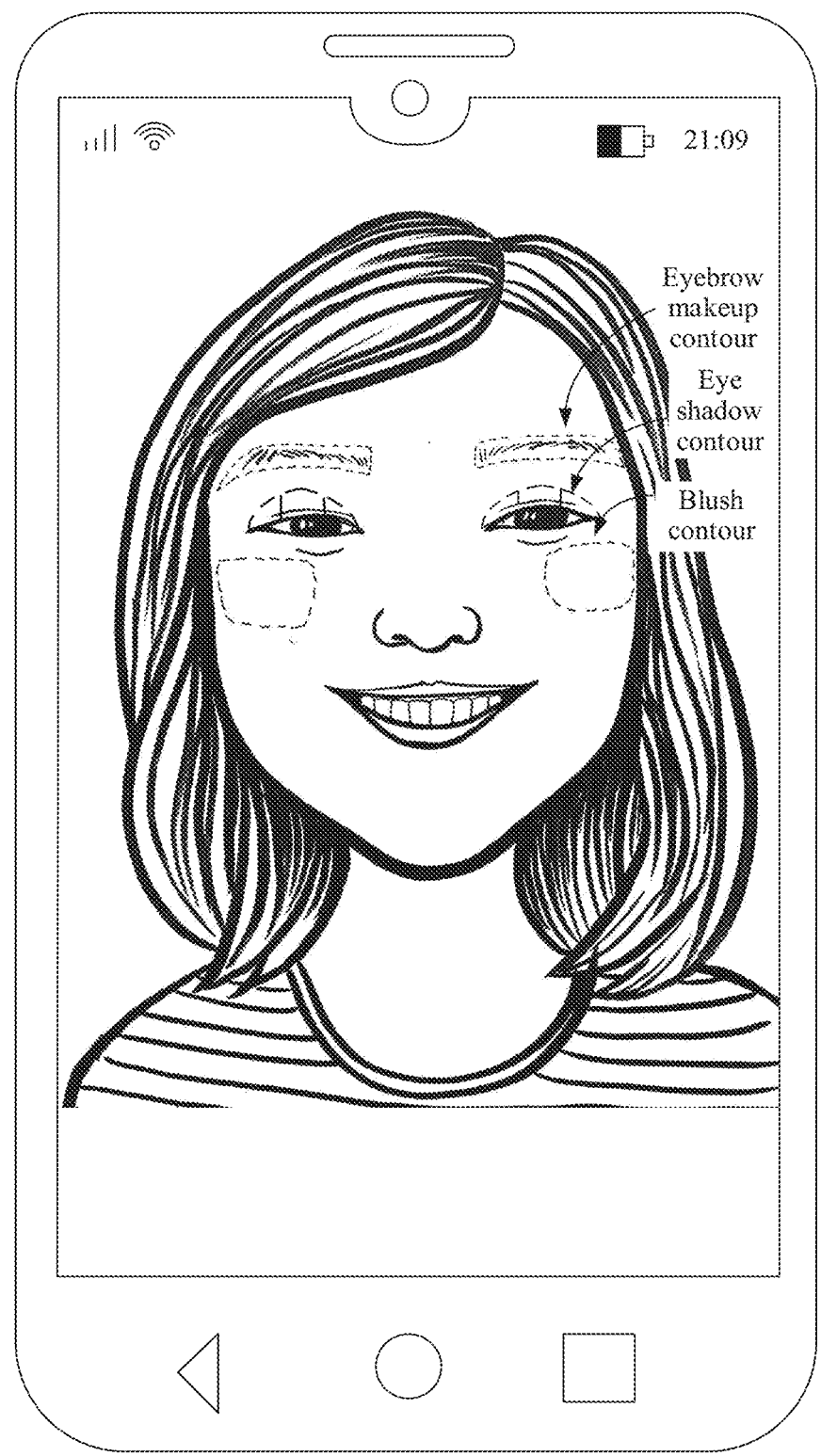
FIG. 6 is a schematic diagram of an image in which a makeup contour is displayed in a superimposed manner according to another embodiment of this application.

It should be noted that, when the terminal device obtains a target makeup effect image for an entire face of the user, a makeup contour corresponding to the target makeup effect image may include an eyebrow makeup contour, an eye shadow contour, and a blush contour. An image, obtained after the makeup contours corresponding to the target makeup effect image are adaptively superimposed on a face image of the user, may be shown in FIG. 6, to assist the user in making up overall makeup. A method for assisting the user in making up the overall makeup is similar to the method for assisting the user in making up the eyebrow makeup, the eye shadow makeup, the blush makeup, or the like. For a specific implementation process, refer to the foregoing related description. Details are not described herein again.

In the foregoing solution, the terminal device obtains the face image of the user in the makeup process, and recognizes colors inside and outside a makeup contour superimposed on the face image, to detect whether the makeup made up by the user exceeds the makeup contour, and detect whether an actual color in the makeup contour is consistent with a preset color corresponding to each makeup contour in the makeup effect image, so as to determine whether the makeup made up by the user is consistent with the makeup in the makeup effect image, and evaluate accuracy of makeup of the user.

When detecting that the makeup made up by the user exceeds the makeup contour, the terminal device may further mark the makeup contour, and when detecting that an actual color of any area in a makeup contour is inconsistent with a corresponding preset color, mark a makeup color of the area, to remind the user of correction. This implements real-time guidance, real-time evaluation and reminding in the makeup process, so that the user performs correction in a timely manner, and make up the makeup the same as the makeup in the makeup effect image as much as possible.

It should be understood that sequence numbers of the steps do not mean execution sequences in the foregoing embodiments. The execution sequences of the processes should be determined based on functions and internal logic of the processes, but should not be construed as any limitation on implementation processes of embodiments of this application.

Figure 7:
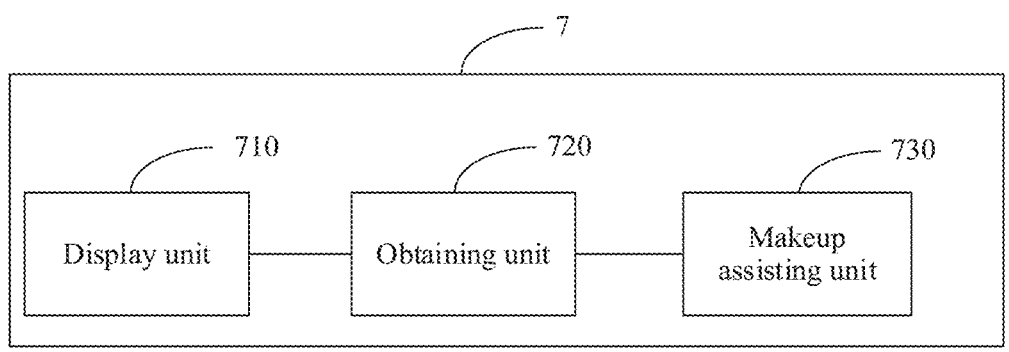
FIG. 7 is a schematic diagram of a structure of a makeup assisting apparatus according to an embodiment of this application.

In correspondence to the method for assisting makeup in the foregoing embodiment, FIG. 7 is a block diagram of a structure a makeup assisting apparatus according to an embodiment of this application. For ease of description, only a part related to embodiments of this application is shown.

Refer to FIG. 7, the makeup assisting apparatus includes:
- a display unit 710, configured to display a face image of a user collected by a camera;
- an obtaining unit 720, configured to obtain makeup contours corresponding to a target makeup effect image; and
- a makeup assisting unit 730, configured to recognize makeup areas corresponding to the makeup contours from the face image, and adaptively superimpose and display the makeup contours on the makeup areas corresponding to the makeup contours, to assist the user in makeup.

In a possible implementation, the target makeup effect image is a makeup effect image selected by the user.

In a possible implementation, the target makeup effect image is a makeup effect image that is recommended by the makeup assisting apparatus based on the face image by using an artificial intelligence technology.

In a possible implementation, the makeup assisting apparatus may further include:
- a detection unit, configured to detect a movement of the face image after the makeup assisting unit adaptively superimposes and displays the makeup contours on the makeup areas corresponding to the makeup contours; and
- a makeup contour adjustment unit, configured to control the makeup contour to adaptively move along with the face image.

In a possible implementation, the makeup assisting apparatus may further include:
- a makeup evaluation unit, configured to: after the makeup assisting unit adaptively superimposes and displays the makeup contours on the makeup areas corresponding to the makeup contours, evaluate makeup corresponding to each makeup contour based on the face image, to obtain a makeup evaluation result.

In a possible implementation, the makeup assisting apparatus may further include:
- a reminding unit, configured to output correction reminder information based on the makeup evaluation result when the makeup evaluation result indicates that makeup corresponding to any makeup area in the face image is inconsistent with makeup in the target makeup effect image.

In a possible implementation, the reminding unit is specifically configured to mark a target area in the face image with an eye-catching color. The target area is a makeup area that is inconsistent with the makeup in the target makeup effect image.

In a possible implementation, the obtaining unit may be further configured to obtain makeup guide information corresponding to the target makeup effect image.

Correspondingly, after the makeup assisting unit adaptively superimposes and displays the makeup contours on the makeup areas corresponding to the makeup contours, the makeup assisting unit may be further configured to display or broadcast the makeup guide information by voice.

In a possible implementation, the makeup evaluation unit may include:
- a first evaluation unit, configured to detect whether makeup in each makeup area in the face image exceeds the makeup contour. When the makeup in any one of makeup areas exceeds the makeup contour, it is indicated that the makeup corresponding to the makeup area is inconsistent with makeup in the target makeup effect image.

In a possible implementation, the makeup evaluation unit may further include:
- a second evaluation unit, configured to detect whether an actual color inside each of the makeup contours in the face image is consistent with a preset color inside each makeup contour in the target makeup effect image. When the makeup in any one of the makeup areas exceeds the makeup contour, or an actual color inside any one of the makeup contours is inconsistent with a preset color, it is indicated that the makeup corresponding to the makeup area is inconsistent with the makeup in the target makeup effect image.

In a possible implementation, the first evaluation unit is specifically configured to:
- obtain information about an actual color outside a makeup contour in each makeup area in the face image, and obtain information about a preset color outside each makeup contour in the target makeup effect image.

When a corresponding actual color outside the makeup contour in any one of the makeup areas is different from a preset color, the makeup in the makeup area exceeds the makeup contour.

In a possible implementation, the first evaluation unit is further configured to:
- determine an actual contour area and a contour determining area that correspond to each of makeup contours in the face image, where the actual contour area includes a makeup contour, and the contour determining area is obtained after the actual contour area is zoomed in based on a preset proportion; and
- obtain a color of an area other than the actual contour area in the contour determining area corresponding to each of the makeup contours, to obtain the actual color outside the makeup contour.

In a possible implementation, the makeup contour includes at least one of an eyebrow makeup contour, an eye shadow contour, a blush contour, and a lip makeup contour.

In a possible implementation, the eye shadow contour and/or the blush contour include/includes a plurality of areas.

In a possible implementation, the makeup effect image displayed on a user interface is obtained from a server after a terminal device detects that the user selects a target makeup type.

In this embodiment, the makeup assisting apparatus may be a terminal device, or a chip in a terminal device, or a function module integrated in a terminal device. The chip or the function module may be located in a control center (for example, a console) of the terminal device, to control the terminal device to implement the method for assisting makeup provided in this application.

It should be noted that, because content such as information exchange and an execution process between the foregoing apparatuses/units is based on a same concept as the foregoing embodiments of method for assisting makeup, for specific functions and technical effects of the content, refer to the embodiments of method for assisting makeup. Details are not described herein again.

It may be clearly understood by a person skilled in the art that, for ease and brevity of description, division of the foregoing functional units and modules is merely used as an example for description. In actual application, the foregoing functions may be allocated to different functional units and modules for implementation according to requirements, that is, an internal structure of the apparatus is divided into different functional units or modules to implement all or some of the foregoing described functions. Functional units and modules in the embodiments may be integrated into one processing unit, or each of the units may exist alone physically, or two or more units are integrated into one unit. The foregoing integrated unit may be implemented in a form of hardware, or may be implemented in a form of a software functional unit. In addition, specific names of the functional units and modules are merely for ease of distinguishing between the functional units and modules, but are not intended to limit the protection scope of this application. For a specific working process of the units and modules in the foregoing system, refer to a corresponding process in the foregoing method embodiments. Details are not described herein again.

Embodiments of this application further provide a terminal device. The terminal device includes at least one processor, a memory, and a computer program that is stored in the memory and that can be run on the at least one processor. When the processor executes the computer program, the terminal device performs the steps in any one of the foregoing embodiments of method for assisting makeup.

Embodiments of this application further provide a computer-readable storage medium. The computer-readable storage medium stores a computer program. When the computer program is executed by a processor, a terminal device is enabled to perform the steps in the foregoing embodiments of method for assisting makeup.

Embodiments of this application provide a computer program product. When the computer program product runs on a mobile terminal, the mobile terminal performs the steps in the foregoing embodiments of method for assisting makeup.

It should be noted that the implementations of this application may be randomly combined to achieve different technical effects.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in the computer-readable medium. The computer-readable medium includes a computer storage medium and a communication medium. The communication medium includes any medium that enables a computer program to be transmitted from one place to another. The computer storage medium may be any available medium accessible to a computer. The computer-readable medium may include at least any entity or apparatus that can carry computer program code to a photographing device/terminal device, a recording medium, a computer memory, a read-only memory (Read-Only Memory, ROM), a random access memory (Random Access Memory, RAM), an electrical carrier signal, a telecommunication signal, and a software distribution medium, for example, a USB flash drive, a removable hard disk, a magnetic disk, or an optical disk. In some jurisdictions, the computer-readable medium cannot be the electrical carrier signal or the telecommunication signal according to legislation and patent practices.

In the foregoing embodiments, the description of each embodiment has respective focuses. For a part that is not described in detail or recorded in an embodiment, refer to related descriptions in another embodiment.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The foregoing embodiments are merely used to describe the technical solutions of this application, but are not intended to limit this application. Although this application is described in detail with reference to the foregoing embodiments, a person of ordinary skill in the art should understand that the technical solutions stored in the foregoing embodiments may still be modified, or some technical features thereof may be equivalently replaced. These modifications or replacements do not enable a corresponding technical solution to depart from the spirit and scope of the technical solutions of embodiments of this application, and shall fall within the protection scope of this application.

What is claimed is:

1. A method for assisting makeup comprising:
obtaining, using a camera, a first face image of a user;
displaying the first face image;
matching a facial feature of the user in the first face image to a makeup effect image from a database or from makeup template information at a server, wherein the matching is based on a preset correspondence between the face feature and the makeup effect image, and wherein the makeup effect image is a post-makeup face image obtained by performing makeup on a sample face globally or on some areas of the sample face;
obtaining makeup contours corresponding to the makeup effect image;
recognizing first makeup areas that are in the first face image and that correspond to the makeup contours; and superimposing and displaying the makeup contours on the first makeup areas to assist the user in application of first makeup.

2. The method of claim 1, further comprising obtaining, from the user, a selection for selecting the makeup effect image.

3. The method of claim 2, further comprising:
detecting a user selection of a target makeup type; and
obtaining, from a server in response to detecting the user selection, the makeup effect image.

4. The method of claim 1, further comprising recommending, based on the first face image and using an artificial intelligence, the makeup effect image.

5. The method of claim 1, wherein after superimposing and displaying the makeup contours, the method further comprises:
detecting a movement of the first face image; and
controlling the makeup contours to move along with the first face image.

6. The method of claim 1, wherein after superimposing and displaying the makeup contours, the method further comprises:
evaluating, based on a second face image of the user, one or more portions that are of the first makeup and that correspond to the makeup contours; and
obtaining, in response to evaluating the one or more portions, a makeup evaluation result.

7. The method of claim 6, wherein after obtaining the makeup evaluation result, the method further comprises:
identifying that at least some of the first makeup that corresponds to second makeup areas in the second face image is inconsistent with a second makeup indicated in the target makeup effect image; and
outputting, in response to identifying that the at least some of the first makeup is inconsistent with the second makeup and based on the makeup evaluation result, correction reminder information.

8. The method of claim 7, further comprising marking a makeup area in the second face image with an eye-catching color, wherein the makeup area is inconsistent with the second makeup.

9. The method of claim 6, further comprising:
recognizing one or more second makeup areas in the second face image that correspond to the makeup contours;
detecting whether the first makeup in each of the one or more second makeup areas exceeds a corresponding makeup contour; and
indicating that the first makeup is inconsistent with a second makeup in the makeup effect image when the first makeup in any one of the one or more second makeup areas exceeds the corresponding makeup contour.

10. The method of claim 9, further comprising:
detecting whether an actual color inside each of the makeup contours is consistent with a preset color inside each second makeup contour in the makeup effect image; and
further indicating that the first makeup in each of the one or more second makeup areas is inconsistent with the second makeup when the first makeup in any one of the one or more second makeup areas exceeds the corresponding makeup contour or when the actual color inside any one of the makeup contours is inconsistent with the preset color.

11. The method of claim 9, further comprising:
obtaining first information about an actual color outside a corresponding makeup contour in each of the one or more second makeup areas;
obtaining second information about a preset color outside each second makeup contour in the target makeup effect image; and
identifying that the first makeup in each of the one or more second makeup areas exceeds the corresponding makeup contour when a corresponding actual color outside the makeup contour in any one of the second makeup areas is different from the preset color.

12. The method of claim 11, further comprising:
determining an actual contour area that corresponds to each of the makeup contours, wherein the actual contour area comprises a first makeup contour;
obtaining a contour determining area corresponding to each of the makeup contours after zooming in on the actual contour area based on a preset proportion; and
obtaining a color of an area other than the actual contour area in the contour determining area to obtain the actual color.

13. The method of claim 1, wherein after displaying the first face image, the method further comprises obtaining makeup guide information corresponding to the makeup effect image, and wherein after superimposing and displaying the makeup contours, the method further comprises displaying the makeup guide information or broadcasting the makeup guide information by voice.

14. The method of claim 1, wherein the makeup contours comprise at least one of an eyebrow makeup contour, an eye shadow contour, a blush contour, or a lip makeup contour.

15. The method of claim 14, wherein the eye shadow contour or the blush contour comprises a plurality of areas.

16. A terminal device comprising:
a camera configured to obtain a first face image of a user; and
a processor coupled to the camera and configured to:
display the first face image;
match a facial feature of the user in the first face image to a makeup effect image from a database or from makeup template information at a server, wherein the matching is based on a preset correspondence between the face feature and the makeup effect image, and wherein the makeup effect image is a post-makeup face image obtained by performing makeup on a sample face globally or on some areas of the sample face;
obtain makeup contours corresponding to the makeup effect image;
recognize makeup areas in the first face image that correspond to the makeup contours; and
superimpose and display the makeup contours on the makeup areas to assist the user in application of first makeup.

17. The terminal device of claim 16, wherein the processor is further configured to recommend, based on the first face image and using an artificial intelligence, the makeup effect image.

18. The terminal device of claim 16, wherein after superimposing and displaying the makeup contours, the processor is further configured to:
evaluate, based on a second face image of the user, one or more portions of the first makeup that correspond to the makeup contours; and
obtain, in response to evaluating the one or more portions, a makeup evaluation result.

19. The terminal device of claim 18, wherein after obtaining the makeup evaluation result, the processor is further configured to:
- identify that at least some of the first makeup that corresponds to second makeup areas in the second face image is inconsistent with a second makeup indicated in the makeup effect image; and
- output, in response to identifying that the at least some of the first makeup is inconsistent with the second makeup and based on the makeup evaluation result, correction reminder information.

20. A computer program product comprising computer-executable instructions that are stored on a non-transitory computer-readable medium and that, when executed by a processor, cause a terminal device to:
- obtain, using a camera of the terminal device, a first face image of a user;
- display the first face image;
- match a facial feature of the user in the first face image to a makeup effect image from a database or from makeup template information at a server, wherein the matching is based on a preset correspondence between the face feature and the makeup effect image, and wherein the makeup effect image is a post-makeup face image obtained by performing makeup on a sample face globally or on some areas of the sample face;
- obtain makeup contours corresponding to the makeup effect image;
- recognize first makeup areas in the first face image that correspond to the makeup contours; and
- superimpose and display the makeup contours on the first makeup areas to assist the user in application of first makeup.

* * * * *

UNITED STATES PATENT AND TRADEMARK OFFICE
CERTIFICATE OF CORRECTION

| | | Page 1 of 1 |
|---|---|---|
| PATENT NO. | : 12,148,075 B2 | |
| APPLICATION NO. | : 17/916378 | |
| DATED | : November 19, 2024 | |
| INVENTOR(S) | : Tao Zou | |

It is certified that error appears in the above-identified patent and that said Letters Patent is hereby corrected as shown below:

On the Title Page

Column 1 Page 2, (56) References Cited, U.S. Patent Documents: "2020/0211245 A1 7/2020 Cn1087652568a" should read "2020/0211245 A1 7/2020 Yang"

Signed and Sealed this
Thirty-first Day of December, 2024

Derrick Brent
*Acting Director of the United States Patent and Trademark Office*